United States Patent
Sintorn et al.

(10) Patent No.: US 9,409,588 B2
(45) Date of Patent: Aug. 9, 2016

(54) STEERING DAMPER WITH ACTIVE ADJUSTMENT OF DAMPING CHARACTERISTICS

(75) Inventors: Torkel Sintorn, Vaxholm (SE); Johan Nilsson, Upplands Vasby (SE); Leif Gustafsson Vallander, Holmsjo (SE); Thorleif Hansen, Upplands Vasby (SE); Joakim Sundevall, Upplands Vasby (SE)

(73) Assignee: Ohlins Racing AB, Vasby (SE)

( * ) Notice: Subject to any disclaimer, the term of this patent is extended or adjusted under 35 U.S.C. 154(b) by 202 days.

(21) Appl. No.: 14/115,830

(22) PCT Filed: May 5, 2011

(86) PCT No.: PCT/EP2011/057231
§ 371 (c)(1),
(2), (4) Date: Mar. 19, 2014

(87) PCT Pub. No.: WO2012/149980
PCT Pub. Date: Nov. 8, 2012

(65) Prior Publication Data
US 2014/0249720 A1    Sep. 4, 2014

(51) Int. Cl.
*B62D 1/02* (2006.01)
*F16F 9/12* (2006.01)
(Continued)

(52) U.S. Cl.
CPC . *B62D 1/02* (2013.01); *B62K 21/08* (2013.01); *F16F 9/125* (2013.01); *F16F 9/145* (2013.01); *B60G 2300/12* (2013.01); *F16F 9/466* (2013.01)

(58) Field of Classification Search
CPC .......... B62K 21/08; F16F 9/125; F16F 9/145; F16F 9/466; B60G 2300/12
See application file for complete search history.

(56) References Cited

U.S. PATENT DOCUMENTS 4,773,514 A * 9/1988 Gustafsson ............ B62K 21/08
188/306
4,961,482 A 10/1990 Pohlenz et al.
(Continued)

FOREIGN PATENT DOCUMENTS

EP    0409094    1/1991
EP    1248013    10/2002
(Continued)

OTHER PUBLICATIONS

Extended European Search Report for Application No. 08779324.6, dated Apr. 16, 2014, in 8 pages.
(Continued)

*Primary Examiner* — Mussa A Shaawat
*Assistant Examiner* — Thomas Ingram
(74) *Attorney, Agent, or Firm* — Knobbe Martens Olson & Bear LLP

(57) ABSTRACT

A device adjusts the rotational damping of a steering device such that the rotational damping varies depending on whether the rotational motion about a steering axis is caused by a force acting on the steering device of the vehicle or a force acting on the part(s) of the vehicle contacting the ground. The flow of hydraulic fluid in the steering damper partly or wholly is adjusted by a main valve unit that is coupled together with both an attaching part and a steering device. The opening area of the main valve unit is determined by a relative motion between the attaching part and the steering device such that the flow of the hydraulic fluid in a direction from and to the respective damping chambers of the steering damper is controlled depending on the cause of the rotational movement.

41 Claims, 15 Drawing Sheets

(51) Int. Cl.
*F16F 9/14* (2006.01)
*F16F 9/46* (2006.01)
*B62K 21/08* (2006.01)

(56) References Cited

U.S. PATENT DOCUMENTS

| | | | |
|---|---|---|---|
| 6,145,637 A | 11/2000 | Hopey | |
| 7,021,433 B2* | 4/2006 | Yamada | F16F 9/145 188/294 |
| 2002/0157909 A1* | 10/2002 | Hasegawa | F16F 9/466 188/290 |
| 2003/0132598 A1* | 7/2003 | Bunya | B62K 21/08 280/272 |
| 2003/0146594 A1* | 8/2003 | Bunya | F16F 9/145 280/272 |
| 2004/0046351 A1* | 3/2004 | Morgan | F16F 9/145 280/272 |
| 2004/0211632 A1* | 10/2004 | Yamada | B62K 21/08 188/290 |
| 2009/0001683 A1* | 1/2009 | Yoshida | B62K 21/08 280/270 |
| 2009/0008197 A1* | 1/2009 | Kamiya | F16F 9/466 188/297 |
| 2009/0314570 A1* | 12/2009 | Gustafsson | B62K 21/08 180/224 |
| 2011/0056782 A1* | 3/2011 | Gustafsson | B62K 21/08 188/290 |
| 2012/0228849 A1* | 9/2012 | Sintorn | B62K 21/04 280/272 |

FOREIGN PATENT DOCUMENTS

| | | |
|---|---|---|
| EP | 1477397 | 11/2004 |
| EP | 1481882 | 12/2004 |
| JP | 2007-016979 | 1/2007 |
| WO | WO 2006/137788 | 12/2006 |
| WO | WO 2007/053944 | 5/2007 |
| WO | WO 2007/134703 | 11/2007 |

OTHER PUBLICATIONS

International Search Report dated Jun. 4, 2011 for International Application No. PCT/EP2010/066932, in 5 pages.
International Search Report dated Jan. 20, 2012 for International Application No. PCT/EP2011/057231, in 2 pages.
International Preliminary Report on Patentability dated Nov. 5, 2013 for International Application No. PCT/EP2011/057231, in 6 pages.

* cited by examiner

STEERING DAMPER WITH ACTIVE ADJUSTMENT OF DAMPING CHARACTERISTICS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application is a national stage application under 35 U.S.C. §371 of PCT Application No. PCT/EP2011/057231 designating the United States, filed May 5, 2011. The PCT Application was published in English as WO 2012/149980 A1 on Nov. 8, 2012.

BACKGROUND OF THE INVENTION

1. Field of the Invention

The present invention relates to an adjustable steering damper intended to be used on a two or four-wheeled or any other vehicle having a steering device comprising a handlebar or a steering wheel rotatable about a steering axis. Preferably the vehicle is a motorcycle, a bicycle, a snowmobile or an ATV. The steering damper is mounted at the steering device and is also coupled together with the frame or chassis by means of an attaching device. The damper is composed of an outer housing in which a main chamber is arranged, the main chamber comprising hydraulic fluid.

The main chamber is partitioned into two chambers, for example by means of a delimiting part that is either rotatable about a first end or laterally displaceable in the chamber. The flow of the hydraulic fluid between the chambers is adjusted by a main valve and enables an adjustable damping of the relative motion between the steering device and the frame/chassis.

2. Description of the Related Art

A steering damper is mounted between the rotating handlebar or steering wheel of a vehicle and its fixed frame or chassis in order to damp shocks and violent movements that propagate from the front wheel(s) to the handlebar. When the steering damper is used on a motorcycle, the steering damper can also solve the problem of wobbling that may occur in a motorcycle at high speeds. Wobbling refers to the front wheel on the motorcycle beginning to oscillate about the steering axis with increasing amplitude. When the steering damper is used on a four-wheeled terrain vehicle, a so called ATV, the steering damper is primarily intended to damp the rapid steering movements caused by, for example, an asymmetric load on the wheels.

It has proven to be a problem to separate desired steering movements from undesired shocks caused by unevenness of the ground in a steering damper. In order to not create a delay in the steering movement when the driver turns the handlebar, it is desirable that this desired rotational movement is undamped. At the same time undesired rotational movements caused by shocks from the ground should be damped as much as possible to minimize the risk of the handlebar being stricken from the hands of the driver. Thus, it is desirable to provide a steering damper that actively adapts the damping based on the cause of the movement.

In EP1248013 the problem is solved by a steering damper that by means of electronics senses and controls the damping on the handlebar depending on whether the movement is caused by the driver or the ground.

A steering damper that solves this problem by means of a principally mechanical solution is not known. A device for controlling a rotational movement of a steering device and/or wheel arrangement relative a chassis of a vehicle is also not known.

SUMMARY OF THE INVENTION

It is with respect to the above considerations and others that the present invention has been made. The present invention seeks to mitigate, alleviate or eliminate one or more of the above-mentioned deficiencies and disadvantages singly or in combination. In particular, the inventor has realized that it would be desirable to achieve a device that enables separating the damping in a steering damper of desired steering movements from undesired shocks caused by unevenness of the ground. The inventor has further realized that it would be desirable to achieve a device that enables separating the damping in a steering damper of desired steering movements from undesired shocks caused by unevenness of the ground in a manner that does not require electronic components. Also, the inventors have also realized that an intentional limited relative movement of rotational movement of a steering device and/or wheel arrangement relative to a chassis of a vehicle may be used to reliably control the rotational movement of a steering device and/or wheel arrangement relative to the chassis of the vehicle. Thus, a built-in relative movement or rotational movement about a steering axis enables a robust and reliable method of controlling a rotational movement of a steering device and/or wheel arrangement relative to a chassis of a vehicle. The limited relative rotational movement also enables a more variable damping force, i.e. the damping force may be accurately varied in response to the relative rotational movement.

It is also desirable that the damper obtains damping characteristics that are the same for different individuals. Furthermore, the final product should be relatively inexpensive and uncomplicated to manufacture.

To achieve this, a device and a method having the features as defined in the independent claims are provided. Further advantageous embodiments of the present invention are defined in the dependent claims.

Certain embodiments provide a device for adjusting the rotational damping of a steering device and/or a wheel arrangement in a vehicle such that the rotational damping varies depending on whether the rotational movement about a steering axis is caused by a force acting on the steering device of the vehicle or by a force acting on the wheel arrangement or the part(s) of the vehicle contacting the ground. In a preferred embodiment, the steering device refers to the handlebar, steering wheel, or the like of the vehicle, and wheel arrangement or parts of the vehicle contacting the ground refer to wheels, runners or similar arrangements that constitute the vehicle's points of contact against the ground. Certain embodiments further relate to a steering device adapted to be arranged in a vehicle.

The devices and methods and steering device according to the present invention are for example intended to be used on a one, two, three or four-wheeled vehicle or any other vehicle having a steering device rotatable about a steering axis for controlling the direction of the vehicle.

In certain embodiments of the present invention, there is provided a device intended for a vehicle. The device comprises a steering device rotatable about a steering axis for adjusting the direction of the part(s) of the vehicle arranged for contacting the ground, an attaching part that couples together the part(s) arranged for contacting the ground with the steering device, and a steering damper. The attaching part rotates with the steering device and with the damping housing of the steering damper that encloses a main damping chamber. The main damping chamber comprises hydraulic fluid and is partitioned into a first and a second damping chamber, wherein flow of hydraulic fluid between the damping chambers of the steering damper is adjusted by means of a main valve unit mechanically coupled together with both the attaching part and the steering device in order to adjust the rotational damping of the steering device. The amount of hydraulic fluid flowing through the main valve unit is determined by a relative movement between the attaching part and the steering device.

Certain embodiments of the present invention provide a device intended for a vehicle. The device comprises a steering device rotatable about a steering axis for adjusting the direction of the part(s) of the vehicle arranged for contacting the ground, an attaching part that couples together the part(s) arranged for contacting the ground with the steering device, and a steering damper. The attaching part rotates with the steering device and with a delimiting part of the steering damper that partitions a main damping chamber which comprises hydraulic fluid into a first and a second damping chamber, wherein flow of hydraulic fluid between the damping chambers of the steering damper is adjusted by means of a main valve unit mechanically coupled together with both the attaching part and the steering device in order to adjust the rotational damping of the steering device. The amount of hydraulic fluid flowing through the main valve unit is determined by a relative movement between the attaching part and the steering device. In other words, by means of the main valve unit being coupled together with both the attaching part and the steering device, an opening area of the main valve unit may be determined by a relative motion between the attaching part and the steering device such that the flow of the hydraulic fluid in a direction from and to the respective damping chamber of the steering damper is controlled depending on the cause of the rotational movement. Such a configuration may enable means for adjusting the rotational damping of a steering device in a vehicle such that the rotational damping varies depending on whether the rotational movement about the steering axis is caused by a force acting on the steering device of the vehicle or by a force acting on the part(s) of the vehicle contacting the ground. In other words, the device of the present invention may enable separating the damping in a steering damper of desired steering movements from undesired shocks caused by unevenness of the ground. This may be achieved by means of a substantially or completely mechanical arrangement. Thus, electronic components may not be required for achieving advantages of the present invention.

Other embodiments of the invention provide a device intended for a vehicle comprising: a steering device rotatable about a steering axis for adjusting the direction of the part(s) of the vehicle arranged for contacting the ground; a steering damper comprising a damping housing that encloses a main damping chamber which comprises hydraulic fluid and is partitioned into a first damping chamber and a second damping chamber by a delimiting part that is arranged in the main damping chamber and movable with respect to the damping housing; an attaching part that couples together the part(s) arranged for contacting the ground with the steering device and a steering damper, wherein the attaching part rotates with the steering device and any one of the damping housing and the delimiting part; and a main valve unit (HVU) adapted to adjust a flow of hydraulic fluid between the damping chambers of the steering damper. The main valve unit (HVU) is mechanically coupled together with both the attaching part and the steering device in order to adjust the rotational damping of the steering device, wherein the amount of hydraulic fluid flowing through the main valve unit (HVU) is determined by a relative movement between said attaching part and the steering device.

Certain embodiments of the invention provide a steering damper adapted to be arranged in a vehicle comprising a steering device rotatable about a steering axis for adjusting the direction of the part(s) of the vehicle arranged for contacting the ground and an attaching part that couples together the part(s) arranged for contacting the ground with the steering device. The steering damper comprises a damping housing and a main damping chamber defined by the damping housing. The main damping chamber comprises hydraulic fluid and is partitioned into a first and a second damping chamber. The steering device is mechanically connectable to the attaching part to enable rotation of the attaching part with the steering device and with the damping housing. A main valve unit is adapted to adjust a flow of hydraulic fluid between the damping chambers in order to adjust the rotational damping of the steering device, wherein the main valve unit can be mechanically coupled together with both the attaching part and the steering device. The steering damper is configured such that a relative movement between the attaching part and the steering device determines an amount of hydraulic fluid flowing through the main valve unit.

Certain embodiments of the invention provide a steering damper adapted to be arranged in a vehicle comprising a steering device rotatable about a steering axis for adjusting the direction of the part(s) of the vehicle arranged for contacting the ground and an attaching part that couples together the part(s) arranged for contacting the ground with the steering device. The steering damper comprises a damping housing and a main damping chamber defined by the damping housing. The main damping chamber comprises hydraulic fluid and is partitioned into a first and a second damping chamber by a delimiting part. The steering device is mechanically connectable to the attaching part to enable rotation of the attaching part with the steering device and with the delimiting part. A main valve unit is adapted to adjust a flow of hydraulic fluid between the damping chambers in order to adjust the rotational damping of the steering device, wherein the main valve unit can be mechanically coupled together with both the attaching part and the steering device. The steering damper is configured such that a relative movement between the attaching part and the steering device determines an amount of hydraulic fluid flowing through the main valve unit. In this manner, the amount of hydraulic fluid flowing through the main valve unit is determined by a relative movement between the attaching part and the steering device.

Thus, according to an aspect of the invention, there is provided a steering damper adapted to be arranged in a vehicle comprising a steering device rotatable about a steering axis (SA) for adjusting the direction of the part(s) of the vehicle arranged for contacting the ground, and an attaching part that couples together the part(s) arranged for contacting the ground with the steering device, the steering damper comprising: a main damping chamber defined by a damping housing, said main damping chamber comprising hydraulic fluid and being partitioned into a first and a second damping chamber; wherein said steering device is mechanically connectable to said attaching part to enable rotation of said attaching part with said steering device and with any one of said damping housing and said delimiting part, a main valve unit (HVU) adapted to adjust a flow of hydraulic fluid between the damping chambers in order to adjust the rotational damping of the steering device, wherein said main valve unit (HVU) can be mechanically coupled together with both the attaching part and the steering device, and wherein a relative movement between said attaching part and the steering device determines an amount of hydraulic fluid flowing through the main valve unit (HVU).

In some embodiments, the main damping chamber being defined by the damping housing may for example refer to an arrangement wherein the damping housing encloses the main damping chamber.

In some embodiments, the main valve unit may be arranged integral with the steering device.

Advantageous exemplifying configurations for realizing the present invention are described in the following.

In certain embodiments, the steering device may be elastically coupled together with the attaching part. The relative movement between the attaching part and the steering device may according to one example occur only during a predetermined initial rotational movement of the steering device from a base position of the steering device.

It is understood that relative rotational movement between the attaching part and the steering device refers to relative movement about the steering axis or about another axis substantially parallel to the steering axis. The main valve unit may comprise a first and a second main valve.

In some embodiments, the device or the steering device may comprise a first main valve part and a second main valve part arranged in the first main valve and a third main valve part and a fourth main valve part arranged in the second main valve. The first main valve part may be coupled together with the steering device and the second main valve part may be coupled together with the damping housing of the steering damper. The third main valve part may be coupled together with the steering device and the fourth main valve part may be coupled together with the damping housing of the steering damper. The first and the second, and the third and the fourth main valve parts, respectively, may be moveable with respect to each other such that they form a first and a second variable opening area through which the hydraulic fluid can flow.

In some embodiments, the opening area of the first main valve may decrease and the opening area of the second main valve may increase when the positions of the first and the second, and the third and the fourth main valve parts, respectively, relative to each other are determined by a rotational motion in a first direction of the steering device or by a rotational motion in a second direction of the housing of the steering device.

In some embodiments, the opening area of the first main valve may increase and the opening area of the second main valve may decrease when the positions of the first and the second, and the third and the fourth main valve parts, respectively, relative to each other are determined by a rotational motion in a second direction of the steering device or by a rotational motion in a first direction of the housing of the steering device.

In some embodiments, the opening area of the first main valve may increase and the opening area of the second main valve may decrease when the positions of the first and the second, and the third and the fourth main valve parts, respectively, relative to each other are determined by a rotational motion in a second direction of the steering device or by a rotational motion in a first direction of the delimiting part of the steering damper.

In some embodiments, the first and third main valve parts of the first and second main valve may move synchronously in relation to each other such that the opening area of the first main valve decreases substantially as much as the opening area of the second main valve increases, and vice versa.

In some embodiments, the device or the steering device may comprise a first driver and a second driver, wherein the first main valve part may be coupled together with the steering device via the first driver and the third main valve part may be coupled together with the steering device via the second driver.

In some embodiments, the first driver may be coupled together with the first main valve part by means of a first link and the second driver may be coupled together with the third main valve part by means of a second link, where the links are hinged in both ends.

In some embodiments, the device or the steering device may comprise at least one spring element, wherein the first driver may be pressed against the first main valve part and the second driver may be pressed against the third main valve part by means of the at least one spring element.

In some embodiments, the at least one spring element may be located between the first main valve part and the third main valve part such that the at least one spring element creates a pressing force acting on both valve parts.

In some embodiments, the device may furthermore comprise a valve actuator being coupled together with the steering device for actuating the first and second main valves during relative movement between the steering device and the attaching part, thereby altering a first and a second variable opening area of the main valve. In other words, the valve actuator is moved in response to movement of the steering device when the valve actuator is coupled to the steering device. The valve actuator may refer to a pin, dowel, bolt or the like. The valve actuator may be coupled to the steering device by means of direct connection or may be coupled to the steering device via an intermediate element which may be attachment means arranged for clamping the steering device to the attaching part. The valve actuator may also refer to an extending portion of the steering device or an extending portion of the intermediate element being coupled to the steering device. Put differently, the valve actuator may be a mechanical element intended to affect the main valve unit upon relative movement between the steering device and the attaching part, i.e. when the steering device is turned or when the attaching part is rotated by force acting on the part(s) of the vehicle contacting the ground.

In some embodiments, the device may furthermore comprise a valve actuator being coupled together with the attaching part for actuating the first and second main valves during relative movement between the steering device and the attaching part, thereby altering a first and a second variable opening area of the main valve. In other words, the valve actuator is moved in response to movement of the attaching part when the valve actuator is coupled to the attaching part.

Put differently, the valve actuator may be a mechanical element intended to affect the main valve unit, in the sense that the hydraulic fluid flowing through the main valve unit is affected, upon relative movement between the steering device and the attaching part, i.e. when the steering device is turned or when the attaching part is rotated by force acting on the part(s) of the vehicle contacting the ground.

In some embodiments, the opening area of the first main valve may decrease and the opening area of the second main valve may increase when the position of the valve actuator is determined by a rotational motion in a first direction of the steering device or by a rotational motion in a second direction of the attaching part. In other words, when the steering device is rotated in a first direction or when the attaching part is rotated in the opposite direction, the opening area of the first valve may decrease and the opening area of the second valve may increase.

In some embodiments, the opening area of the first main valve may increase and the opening area of the second main valve may decrease when the position of the valve actuator is determined by a rotational motion in a second direction of the steering device or by a rotational motion in a first direction of the attaching part. In other words, when the steering device is rotated in a second direction or when the attaching part is rotated in the opposite direction, the opening area of the first valve may increase and the opening area of the second valve may decrease. The device or the steering device may comprise at least one holding-up means arranged between the attaching part and the steering device, the at least one holding-up means being arranged to determine the magnitude of the initial rotational motion.

In some embodiments, the steering device may be coupled together with the attaching part via a torsion bar for allowing relative rotational movement between the steering device and the attaching part about a centre axis of the torsion bar. It is understood that torsion bar refers to a metal element being substantially elastically twistable and that acts as a spring. The torsion bar may be arranged in parallel to the steering axis.

In some embodiments, the steering device may be coupled together with the attaching part via a silent block bush for allowing relative rotational movement between the steering device and the attaching part about a centre axis of the silent block bush. It is understood that silent block bush refers to a type of bush having an inner and an outer sleeve, which may be metallic, between which a bush (which may be a rubber bush) is sandwiched.

In some embodiments, the steering device may be coupled together with the attaching part via a bearing for allowing relative rotational movement between the steering device and the attaching part about a centre axis of the bearing. It is understood that bearing may refer to any type of bearing such as a ball bearing, roller bearing, sleeve bearing or a plain bearing for example.

In some embodiments, the centre axis of the torsion bar, silent block bush or bearing may be arranged at a distance from the steering axis. In other words, the steering device rotates relative to the attaching part about the centre axis of the torsion bar, silent block bush or bearing which is arranged at a distance from the steering axis.

In some embodiments, the device may further comprise at least two mechanical stops for limiting said relative movement between the attaching part and the steering device. Hereby it may be possible to avoid excessive rotational movement between the steering device and the attaching part which otherwise could result in damage to the torsion bar or the silent block bush. The two mechanical stops may refer to two mechanical elements such as two pins extending from the attaching part, thereby limiting the relative rotational movement. In other embodiments, the two mechanical stops may refer to mechanical devices involving at least two parts. The mechanical stops may interact with other portions of the attaching part or the steering device. The mechanical stops may refer to portions of an intermediate element such as attaching means for clamping the steering wheel to the attaching part.

In some embodiments, the two mechanical stops may comprise at least one element slideably arranged in an opening between two surfaces portions thereof, such that the element is moveable between said surface portions in order to limit said relative movement to rotational movement. Hereby it may be possible to avoid damaging the torsion bar, the silent block bush or the bearing if for example force is applied to the steering device in directions other than in the rotational direction. One such case may be during a motorcycle crash or during rough offroad driving. In one embodiment, an element is attached to one of the steering device and the attaching part and an opening is arranged in the other one of the steering device and the attaching part, in which opening the element is slidably arranged. The opening may be a hole, a slot, an aperture or the like. The opening may have dimensions relative to the element to achieve play such that slideable operation is achieved. The element may have geometric properties such that axial relative movement between the steering device and the attaching part is limited. For example, the element may be shaped substantially as a bolt or screw, i.e. having a larger diameter in its one end. The attaching part may for example comprise a fork crown arranged at the front fork arrangement of a motorcycle.

In some embodiments, the attaching part may comprise a cylindrical unit arranged around a steering connecting rod through which the steering axis runs.

In some embodiments, the attaching part may be divided into an upper and a lower cylindrical part coupled together by means of an elastic holding-up means which is arranged to determine the magnitude of the initial rotational motion.

In some embodiments, the device or the steering device may comprise a delimiting part arranged in the main damping chamber, which delimiting part is moveable with respect to the damping housing.

In some embodiments, the steering damper may be a linear damping device in which the delimiting part is a piston attached to a piston rod for reciprocal movement within said damping chamber. The steering damper may be arranged at least partly inside the attaching part for achieving a compact installation. The piston rod may be hollow in order to achieve hydraulic fluid flow passages to the damping chambers.

In some embodiments, the steering damper may be a rotational damping device, in which the delimiting part is a wing attached to a lever for reciprocal movement within said damping chamber. It is understood that lever refers to a mechanical element arranged for transferring rotational force to and from the wing. The rotational damping device may be of the type commonly referred to as a wing damper.

Certain embodiments provide a crown device adapted to be arranged in a vehicle comprising a steering device rotatable about a steering axis for adjusting the direction of the part(s) of the vehicle arranged for contacting ground. The crown device may comprise a steering damper, an attaching part and a main valve unit. The steering damper comprises a damping housing that encloses a main damping chamber which comprises hydraulic fluid and is partitioned into a first damping chamber and a second damping chamber by a delimiting part that is arranged in the main damping chamber and moveable with respect to the damping housing. The attaching part is adapted to couple together the part(s) arranged for contacting the ground with the steering device when the crown device is arranged in the vehicle. The attaching part is arranged to rotate with the steering device when the crown device is arranged in the vehicle. The main valve unit is adapted to adjust a flow of hydraulic fluid between the damping chambers of the steering damper when the crown device is arranged in the vehicle. The main valve unit is coupled together with both the attaching part and the steering device when the crown device is arranged in the vehicle in order to adjust the rotational damping of the steering device. The amount of hydraulic fluid flowing through the main valve unit is determined by a relative movement between the attaching part and the steering device.

Thus, a relative movement is provided by allowing the steering device to move relative to the attachment part. Furthermore, by monitoring or measuring that relative movement between the steering device and the attaching part, the rotational damping of a steering device is adjustable such that the rotational damping varies depending on whether the rotational movement about a steering axis is caused by a force acting on the steering device of the vehicle or by a force acting on the part(s) of the vehicle contacting the ground.

Advantageous exemplifying configurations for realizing the present invention are described in the following.

The crown device may comprise attachment means adapted to couple the steering device together with the attaching part when the crown device is arranged in the vehicle, wherein the attachment means is arranged to allow relative movement between the attaching part and the steering device when the crown device is arranged in the vehicle. In other words, the attachment means may be an intermediate element between the attaching part and the steering device allowing relative movement between the attaching part and the steering device. The relative movement may be realized between the attaching part and the attachment means, i.e. the steering device is fixed to the attachment means. Alternatively, the relative movement may be realized between the steering device and the attachment means, i.e. the attaching part is fixed to the attachment means.

The attachment means may be adapted to elastically couple the steering device together with the attaching part when the crown device is arranged in the vehicle, wherein the attachment means is arranged to elastically allow relative movement between the attaching part and the steering device when the crown device is arranged in the vehicle.

The main valve unit may be mechanically coupled together with both the attaching part and the steering device in order to adjust the rotational damping of the steering device. Hereby a mechanical crown device may be achieved which may not require electronics to achieve actuation of the main valve unit.

The crown device may furthermore comprise an electronic sensor adapted to measure said relative movement between the attaching part and the steering device. Hereby the relative movement may be measured electronically and the steering damper may be controlled in a customized manner by for example an electronic control unit (ECU). From a friction perspective, using an electronic sensor may also be advantageous as compared to a mechanical actuating mechanism.

The electronic sensor may be selected from a group of sensors comprising a potentiometer, a hall effect sensor, and an optical sensor.

The electronic sensor may be arranged to measure the magnitude and the direction of the relative movement between the attaching part and the steering device when the crown device is arranged in the vehicle. This may be advantageous because the additional information provided by the electronic sensor, i.e. magnitude and direction may be used to achieve improved control of the steering damper.

The main valve unit may be electrically actuated in response to a relative movement between the attaching part and the steering device measured by an electronic sensor. The main valve unit may comprise actuation means, for example a solenoid or an electric motor, actuating at least one main valve of the main valve unit directly, thereby adjusting the flow of hydraulic fluid through the main valve unit. The main valve unit may comprise at least one pilot valve being actuated electrically using for example a solenoid. The pilot valve is used to control the main valve which in turn adjusts the flow of hydraulic fluid through the main valve unit.

Certain embodiments provide a device for controlling rotational movement of a steering device and/or a thereto connected wheel arrangement about a steering axis relative a chassis of a vehicle. Thus, a device for controlling rotational movement of a steering device about a steering axis relative a chassis of a vehicle or a device for controlling rotational movement of a wheel arrangement about a steering axis relative a chassis of a vehicle is disclosed. The steering device is mechanically connected to the wheel arrangement such that a limited relative rotational movement there between is allowed. In other words, the steering device and the wheel arrangement are connected to each other such that they are rotatable relative each other within a limited rotational range. The device further comprises a main valve unit having a first valve member mechanically connectable to the steering device and a second valve member mechanically connectable to a wheel arrangement. The first valve member is arranged to interact with the second valve member to adjust a flow passage area in response to the relative rotational movement in order to control the rotational movement of the steering device and/or the thereto connected wheel arrangement about the steering axis relative the chassis. In other words, when the first valve member interacts with the second valve member, the flow passage area of a flow passage arranged in the main valve unit is adjusted in response to the relative rotational movement.

The device may further comprise a first element being connectable with the steering device, and a second element being connectable to the wheel arrangement. The second element is mechanically coupled to the first element to allow limited relative rotational movement. The first valve member is mechanically connected to the first element and the second valve member is mechanically connected to the second element. In other words, a limited relative rotational movement between the steering device and the wheel arrangement is allowed when the steering device is connected to the wheel arrangement via a first element and a second element.

The device may further comprise a damper unit having working chambers arranged in fluid communication with the main valve unit such that a flow of damping fluid between the chambers is adjusted or restricted in response to the adjustment of the flow passage area. It is understood that the working chambers of the damper unit refer to the chambers formed by dividing the interior of a damper unit with a delimiting part. It is understood that the interior of a damper unit is adapted to be filled with a damping fluid. In other words, the device may further comprise a damper unit, wherein the working chambers of the damper unit are fluidically coupled to or in fluid communication with the main valve unit such that a flow between the chambers passes through the adjustable flow passage area of the main valve unit.

The second element may be elastically coupled to the first element. Thereby, the limited relative rotational movement between the first and second element and thereby a limited relative rotational movement between the steering device and the wheel arrangement is achieved.

The device may further comprise elastic holding means being attached between the first element and the second element for providing the elastic coupling.

The second element may be coupled to the first element via a torsion bar, a silent block bush or a bearing to allow a limited relative rotational movement there between about a centre axis of the torsion bar, silent block bush or bearing.

The centre axis may be arranged at a distance from the steering axis. In other words, the first element (and the steering device) rotates relative to the second element about the centre axis of the torsion bar, silent block bush or bearing which is arranged at a distance from the steering axis.

The device may further comprise at least two mechanical stops for limiting the relative movement. Hereby it may be possible to avoid excessive rotational movement between the first and second elements which otherwise could result in damage to the torsion bar or the silent block bush. The two mechanical stops may refer to two mechanical elements such as two pins extending from the second element, thereby limiting the relative rotational movement. In other embodiments, the two mechanical stops may refer to mechanical devices involving at least two parts. The mechanical stops may interact with other portions of the first and/or second elements. The two mechanical stops may comprise at least one element slideably arranged in an opening between two surface portions thereof, such that the element is moveable between the surface portions in order to limit the relative movement to rotational movement. Hereby it may be possible to avoid damaging the torsion bar, the silent block bush or the bearing if for example force is applied to the steering device in other directions than in the rotational direction. One such case may be during a motorcycle crash or during rough offroad driving.

The torsion bar may be arranged to be releasably connectable to the first element and the second element. Thereby a possibility is provided for a vehicle user or a mechanic or the like to replace the torsion bar with another torsion bar with a different elasticity thereby adjusting the response time of the steering damping.

The first valve member may be arranged to interact with the second valve member to adjust an additional flow passage area in response to the relative rotational movement in order to control the rotational movement of the steering device and/or the thereto connected wheel arrangement about the steering axis relative the chassis. In other words, when the first valve member interacts with the second valve member, the additional flow passage area of an additional flow passage arranged in the main valve unit is adjusted in response to the relative rotational movement.

The device may further comprise an additional main valve unit having a third valve member mechanically connectable to the steering device and a fourth valve member mechanically connectable to the wheel arrangement, the third valve member being arranged to interact with the fourth valve member to adjust an additional flow passage area in response to the relative rotational movement in order to control the rotational movement of the steering device and/or the thereto connected wheel arrangement about the steering axis relative the chassis.

The working chambers may be in fluid communication with the main valve unit(s) such that a flow of damping fluid between the chambers is adjusted or restricted in response to the adjustment of the one additional flow passage area. In other words, the working chambers of the damper unit may be fluidically coupled to the main valve unit or units such that a flow between the chambers passes through the adjustable additional flow passage or additional adjustable flow passage area of the main valve unit.

The flow passage area may be arranged to adjust a flow of hydraulic fluid between the working chambers in a first direction, and the additional flow passage area may be arranged to adjust a flow of hydraulic fluid between the working chambers in a second direction, the second direction being opposite to the first direction.

The main valve unit may comprise adjustment means for adjusting the interaction between the first valve member and the second valve member.

The additional main valve unit may comprise adjustment means for adjusting the interaction between the third valve member and the fourth valve member.

The damper unit may be a hydraulic damper comprising a damping chamber and a delimiting part, the delimiting part dividing the damping chamber into two working chambers.

The damper unit may be a linear damper unit wherein the delimiting part is a piston.

The damper unit may be a rotational damper unit wherein the delimiting part is a wing element.

The damper unit may be integrated with the main valve unit.

Certain embodiments provide a device for controlling rotational movement of a steering device and/or a thereto connected wheel arrangement about a steering axis relative a chassis of a vehicle, the steering device being mechanically connected to the wheel arrangement such that a limited relative rotational movement there between is allowed. The device comprises a main valve unit having a first valve member mechanically connectable to the steering device and a second valve member mechanically connectable to a wheel arrangement, the first valve member being arranged to interact with the second valve member to adjust a flow passage area in response to the relative rotational movement in order to control the rotational movement of the steering device and/or the thereto connected wheel arrangement about the steering axis relative the chassis. In other words, the device comprises a main valve unit having a first valve member mechanically connectable to the steering device and a second valve member mechanically connectable to a wheel arrangement, the first valve member being arranged to interact with the second valve member to adjust a flow passage area of a flow passage in response to the relative rotational movement in order to control the rotational movement of the steering device and/or the thereto connected wheel arrangement about the steering axis relative the chassis. The device further comprises a first sensor device in operational communication with the steering device and the wheel arrangement, the first sensor device being adapted to monitor a rotational position of the steering device relative to the wheel arrangement when in operational communication with the steering device and the wheel arrangement.

The device may furthermore comprise a first element being connectable with the steering device and a second element being connectable to the wheel arrangement. The second element is mechanically coupled to the first element to allow the limited relative rotational movement and the first sensor device may be in operational communication with the first element and the second element. The first sensor device may be adapted to monitor a rotational position of the steering device relative to the wheel arrangement.

The device may furthermore comprise a second sensor device in operational communication with the chassis and the first or second element. The second sensor device may be adapted to monitor a rotational position of the steering device or the wheel arrangement relative to the chassis.

The first sensor device may be adapted to monitor a rotational position of the steering device relative to the wheel arrangement throughout at least part of the limited relative rotational movement.

The first sensor device may be adapted to monitor a rotational position of the steering device relative to the wheel arrangement throughout the whole of the limited relative rotational movement.

The device may further comprise an electrically controlled valve unit coupled to the sensor device(s), wherein the electrically controlled valve unit is adapted to adjust a flow passage area in response to a signal from the sensor device(s) representing the rotational position.

The device may further comprise a damper unit in fluid communication with the electrically controlled valve unit, wherein the damper unit is adapted to control or damp a rotational movement of the steering device or the wheel arrangement relative to the chassis with a damping force adjusted in response to the adjustment of the flow passage area.

The device may further comprise an electrically controlled damper unit adapted to control or damp a rotational movement of the steering device or the wheel arrangement relative to the chassis, wherein the electrically controlled damper unit is coupled to the sensor device(s) and is adapted to adjust its damping force in response to signal(s) from the sensor device(s) representing the rotational position(s) of the steering device.

The damper unit may be adapted to control or damp a rotational movement in one rotational direction.

The damper unit may be adapted to control or damp a rotational movement in both rotational directions.

The device may further comprise two electrically controlled valves coupled to the sensor device(s), wherein each of the electrically controlled valves are adapted to adjust a flow passage area in response to a signal from the sensor device(s) representing the rotational position.

The device may further comprise a damper unit in fluid communication with the two electrically controlled valve units, wherein the damper unit is adapted to control or damp a rotational movement of the steering device or the wheel arrangement relative to the chassis with a first damping force in one direction and a second damping force in a second and opposite direction, and the first and second damping forces are adjusted in response to the adjustment of the flow passage areas.

The first sensor device may comprise a first member mechanically connectable with the first element or the steering device, wherein the first sensor device further comprises a second member mechanically connectable with the second element or the wheel arrangement, wherein the first valve member is arranged to interact with the second valve member in order to provide a signal representing the relative rotational position of the steering device and wheel arrangement.

The second sensor device may comprise a third member mechanically connectable with the first element or the steering device, wherein the second sensor device further comprises a fourth member mechanically connectable with the second element or the wheel arrangement, wherein the third member is arranged to interact with the fourth valve member in order to provide a signal representing the relative rotational position of the steering device and wheel arrangement.

The damper unit may be a hydraulic damper unit selected from a group comprising linear hydraulic damper and rotational damper.

The damper unit may be a magnetorheological damper or an electromechanical damper.

The sensor(s) may be selected from a group of sensors comprising:
a potentiometer, a hall effect sensor and an optical sensor.

The second element or wheel arrangement may be elastically coupled to the first element or steering device.

The second element may be coupled to the first element via a torsion bar, a silent block bush or a bearing arrangement.

The electronically controlled valve unit and/or damper unit may be adjustable in response to at least one parameter selected from a group comprising vehicle speed, vehicle acceleration, vehicle braking, the rotational position(s) and rotational acceleration of the steering device and/or wheel arrangement relative to each other or relative to the chassis.

Certain embodiments provide a method of controlling rotational movement of a steering device and a thereto coupled wheel arrangement about a steering axis relative a chassis of a vehicle, the method comprising allowing a limited relative rotational movement between the steering device and the wheel arrangement and monitoring a rotational position parameter reflecting a rotational position of the steering device or the wheel arrangement relative the other rotational position parameter including a rotational position value (thus, monitoring a rotational position parameter reflecting a rotational position of the steering device relative the wheel arrangement or monitoring a rotational position parameter reflecting a rotational position of the wheel arrangement relative the steering device). The method also includes performing a damping force analysis including a comparison of the rotational position value and reference rotational position value and determining a specific damping force for controlling the rotational movement of the steering device and the thereto coupled wheel arrangement about a steering axis relative the chassis, the specific damping force value corresponding to a difference between the rotational position value and the reference rotational position value.

The method may further comprise providing a damping force signal representing the determined damping force to an electrically controlled valve unit, wherein the electrically controlled valve unit is adapted to adjust a flow passage area in response to the damping force signal.

The method may further comprise providing a damper unit in fluid communication with the electrically controlled valve unit, wherein the damper unit is adapted to control or damp a rotational movement of the steering device or the wheel arrangement relative the chassis with a damping force adjusted in response to the adjustment of the flow passage area.

The method may further comprise providing an electrically controlled damper unit adapted to control or damp a rotational movement of the steering device or the wheel arrangement relative the chassis, wherein the electrically controlled damper unit is coupled to the sensor device(s) and is adapted to adjust its damping force in response to the damping force signal.

The damper unit may be adapted to control or damp a rotational movement in one rotational direction.

The damper unit may be adapted to control or damp a rotational movement in both rotational directions.

Further objects and advantages of the various embodiments of the present invention will be described below by means of exemplifying embodiments.

BRIEF DESCRIPTION OF THE DRAWINGS

Exemplifying embodiments of the invention will be described below with reference to the accompanying drawings, in which.

In the accompanying drawings, the same reference numerals denote the same or similar elements throughout the views.

DETAILED DESCRIPTION OF THE PREFERRED EMBODIMENT

The present invention will now be described more fully hereinafter with reference to the accompanying drawings, in which exemplifying embodiments of the invention are shown. This invention may, however, be embodied in many different forms and should not be construed as limited to the embodiments set forth herein; rather, these embodiments are provided by way of example so that this disclosure will convey the scope of the invention to those skilled in the art. Furthermore, like numbers refer to like or similar elements throughout.

Figure 1:
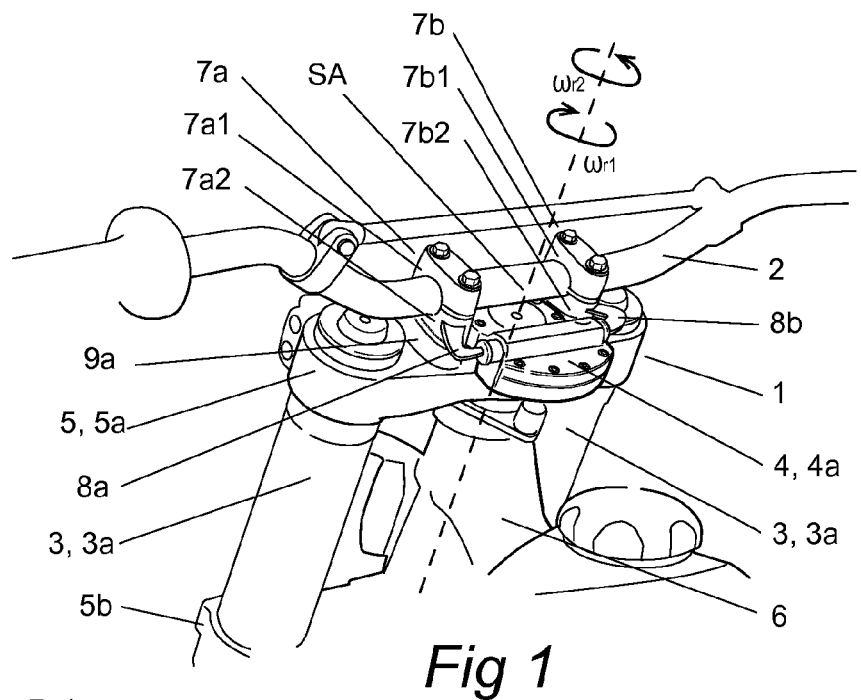
FIG. 1 is a view of a first embodiment of the present invention where the invention is arranged on a motorcycle.

FIG. 1 is a view of a first embodiment of the present invention where the invention is arranged on a vehicle in the form of a motorcycle having two parts 3 contacting the ground—one front wheel (not shown) coupled together with the chassis by means of a front fork having two fork legs 3a and a back wheel attached in the chassis by means of a swing arm (not shown). According to one aspect of the invention three wheels on this type of vehicle is also possible. The joining between the front fork legs 3a of the motorcycle and the motorcycle frame's front chassis 6 takes place by means of one or several attaching parts 5 which in this case have the shape of fork crowns 5a, 5b. The fork crowns 5a, 5b are rotatable about a steering axis SA centered in a steering column 6 extending through both of the fork crowns 5a, 5b. The front wheel (not shown) of the motorcycle is located between the right fork leg and the symmetrically located left fork leg 3a so that rotation of front wheel, fork crowns 5a, 5b and fork legs 3a takes place about the steering axis SA. A steering device 2 in the form of a handlebar is attached in the upper fork crown 5a by means of a first 7a and second 7b attachment means. The attachment means 7a, 7b comprise two parts; an upper 7a1, 7b1 and a lower 7a2, 7b2, between which the handlebar 2 is clamped.

In addition to a handlebar, a steering wheel can also be used as steering device 2 for adjusting the direction of the vehicle's part(s) 3 contacting the ground. In FIGS. 1 and 8a-8c, the rotational movement of the steering device 2 about the steering axis SA is shown by the arrows marked with $\omega_{r1}$, $\omega_{r2}$. When the vehicle is advanced straight forward, the steering device 2 can be thought of to be in a base position in which the handlebar or the steering wheel is set such that the vehicle's part(s) 3 contacting the ground are parallel with the direction of travel when no forces act on the wheel.

In FIG. 1 a steering damper 4 is mounted below the steering device 2 between the attachment means 7a, 7b and attached to the upper 5a of the fork crowns 5. The steering damper 4 is coupled together with the lower part 7a2, 7b2 of the respective attachment means by means of a first and a second driver 11a, 11b. The steering damper 4 can also be mounted above the handlebar or steering device or at another position in proximity of the handlebar.

Figure 2:
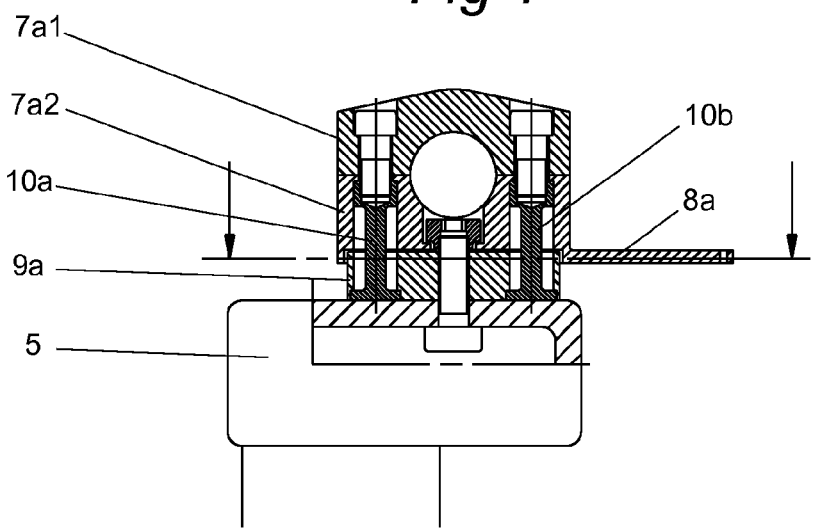
FIG. 2 is a sectional view of one of the attachment means.

In FIG. 2 there is shown a sectional view of one of the attachment means 7a. Preferably both of the attachment means 7a, 7b are constructed in the same manner. A third attachment part 9a, 9b is arranged in the attaching part 5 which couples together the attachment means 7a, 7b and the attaching part 5. Holding-up means 10a, 10b are arranged between the lower attachment means part 7a2, 7b2 and the third attachment part 9a, 9b. The holding-up means 10a, 10b are constructed such that they are elastic in the direction of rotation such that the lower attachment means part 7a2, 7b2 can rotate with an initial rotational movement with respect to the third attachment part 9a, 9b. The third attachment part 9a, 9b can be omitted in some embodiments. In these embodiments, the lower attachment means part 7a2, 7b2 is instead elastically attached directly in the attaching part 5 via the holding up-means 10a, 10b. Drivers 8a, 8b extend from the lower attachment part 7a2, 7b2. Drivers 8a, 8b may be made of the same material or be a separate unit attached in the lower attachment part 7a2, 7b2.

Figure 3A:
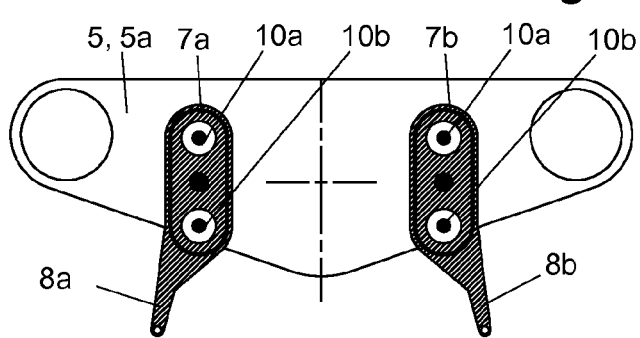
FIGS. 3a and 3b show holding-up means arranged in the attachment means.
Figure 3B:
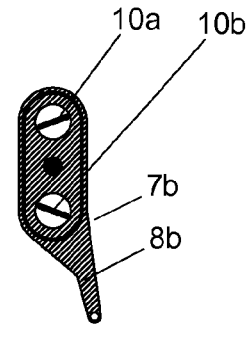

The holding-up means 10a, 10b can also be constructed such that they are more elastic when rotated compared to when bent. The holding-up means 10a, 10b can in that case be arranged in the attachment means in the manner shown in FIG. 3a. The holding-up means 10a, 10b can have a waist, meaning that the central portion of the holding-up means 10a, 10b is tapered. The tapering preferably is radially symmetric around the whole holding-up means 10a, 10b, as shown in FIG. 3a, or mainly in a lateral direction, as shown in FIG. 3b, such that the pliancy of the holding-up means 10a, 10b depends on how the holding-up means 10a, 10b are mounted in the attachment means 7a, 7b. Thus, the lower attachment means part 7a2, 7b2, with which the handlebar 2 is coupled together, can to a larger degree be moved rotationally compared to horizontally with respect to the third attachment part 9a, 9b. In other words, the attachments means part 7a2, 7b2 and the third attachment part 9a, 9b may rotate in relation to each other within an initial rotational movement, but when the driver causes a force on the handlebar 2 in the direction of movement of the vehicle the coupling is mainly inelastic. Because the steering device 2 is elastically coupled together with the attaching part 5, rotation of the steering device 2 about the steering axis SA begins only after a predetermined initial rotational movement from the base position of the steering device 2 has taken place.

Figure 4:
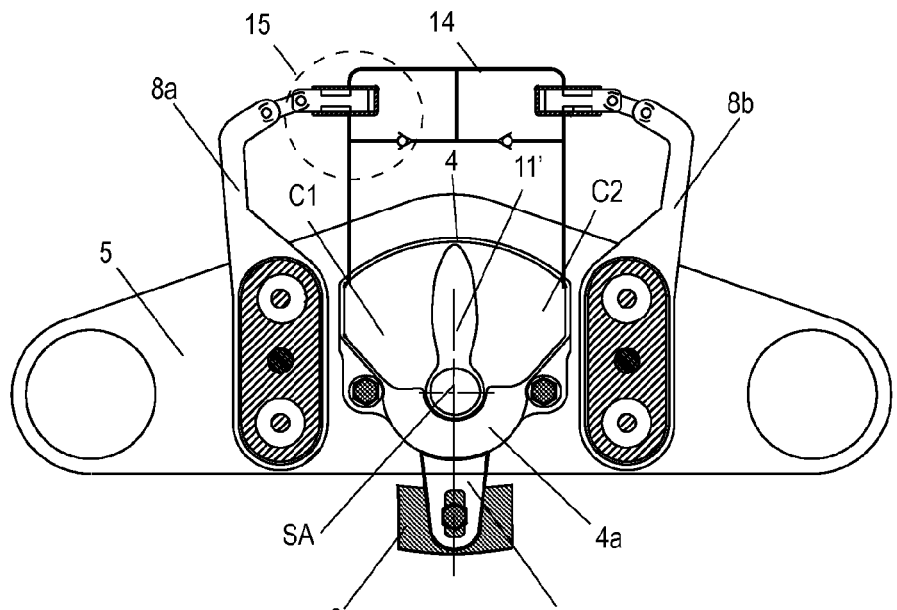
FIG. 4 is a sectional view through a first type of steering damper.
Figure 5:
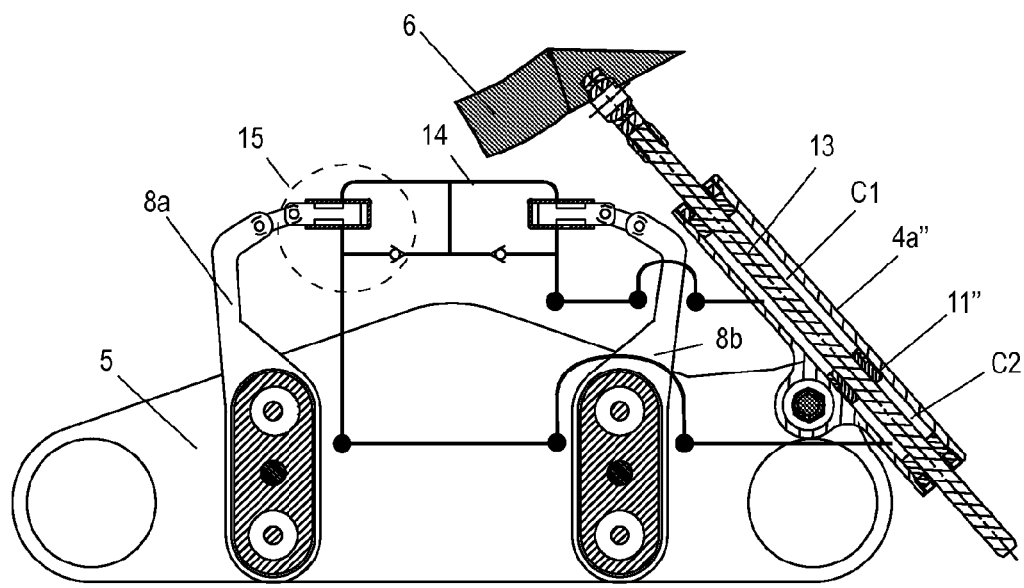
FIG. 5 is a sectional view through a second type of steering damper.

A first and a second type of steering damper having an inner moveable delimiting part 11 are shown in more detail in FIGS. 4 and 5.

FIG. 4 is a sectional view through a first type of steering damper, a rotational steering damper, comprising an outer damping housing 4a enclosing a main damping chamber which comprises hydraulic fluid and is partitioned into two damping chambers C1, C2 by means of a delimiting part 11 in the form of a wing 11'. The wing 11' is rotatable about the steering axis SA at a first wing end. The main damping chamber may be arranged to be filled with hydraulic fluid. The hydraulic fluid preferably comprises oil, possibly comprising various additives. The outer surface of the wing end rotates in a custom-made cut-out in the housing 4a. In the first wing end there is also attached a lever 12. The lever 12 rotates with the wing 11' in relation to the outer housing 4a and it is according to known techniques intended to couple together the steering damper 4, which rotates in relation to the steering device 2, with the frame/chassis 6 of the vehicle. By means of this fixture the movement of the attaching part 5 in the damping chamber mainly becomes related to the movement of the handlebar 2 and the wing 11' in relation to the frame 6 of the vehicle. It is also possible to attach the housing 4a of the steering damper in the chassis/frame 6 and couple together the wing 11' with the attaching part 5, which rotates in relation to the handlebar 2, and achieve the same function.

FIG. 5 shows a second type of steering damper, a linear steering damper, comprising an outer, cylindrically shaped housing 4a" partitioned into two damping chambers C1, C2 by means of a delimiting part in the form of a piston 11" attached to a piston rod 13. The piston rod 13 may either extend through the whole of the cylindrically shaped housing 4a" or be arranged on a side of the piston 11". The steering damper housing 4a" is coupled together with any of the attaching parts 5 rotating about the steering axis SA together with the handlebar 2 and the piston bar 13 is coupled together with the chassis/frame 6, or vice versa.

In both embodiments shown in FIGS. 4 and 5, the relative motion between the parts rotating about the steering axis SA and the chassis is damped by the delimiting part 11 moving in relation to the steering damper housing 4 and pressing hydraulic fluid through one or several channels 14. The channel 14 is preferably arranged as a hole in the damping housing 4a and delimited by a valve arrangement 15.

Figure 6:
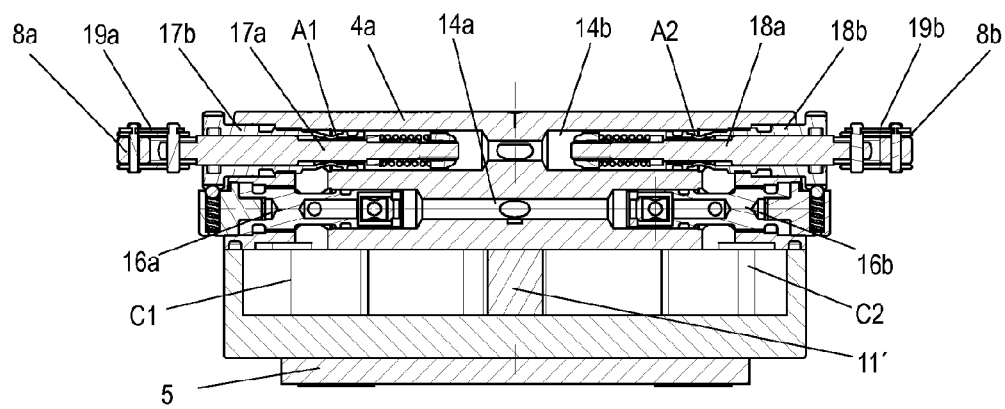
FIG. 6 shows the valve arrangement according to a first embodiment.

The valve arrangement 15 is shown in detail in FIG. 6 and comprises at least one non-return valve 16, in this embodiment two non-return valves 16a, 16b, and a main valve unit HVU comprising one or several main valves 17, 18 mechanically coupled together with both the attaching part 5 and the steering device 2.

The first main valve comprises a first main valve part 17a and a second main valve part 17b. The first main valve part 17a is closely coupled together with the steering device 2 via a first link 19a to the first driver 8a and the second main valve part 17b is closely coupled together with the attaching part 5 via the damping housing 4a of the steering damper. The second main valve comprises a third main valve part 18a and a fourth main valve part 18b. The third main valve part 18a is, via a second link, closely coupled together with the steering device 2 by means of the second driver 8b and the fourth main valve part 18b is closely coupled together with the attaching part 5 via the damping housing 4a of the steering damper as well. The first and the second 17a, 17b and the third and the fourth main valve parts 18a, 18b, respectively, move relative to each other during the initial rotational movement. This creates a first and a second variable opening area A1, A2 through which the hydraulic fluid can flow when a pressure difference between the damping chambers C1, C2 is present and when no disturbance acts in a direction that is reverse to the intentional rotational movement of the steering means. By means of coordinated effect on the main valves' first and third valve parts 17a, 18a by respective adjustment devices, the opening area A1 of the first main valve 17 decreases while the opening area A2 of the second main valve 18 at the same time increases, and vice versa. An adjustment in the opening area results in control of the flow of hydraulic fluid from and to the respective damping chamber C1, C2 of the steering damper being enabled and eventually completely flowing freely or being brought to a stop when the initial rotation has been finished.

Figure 7:
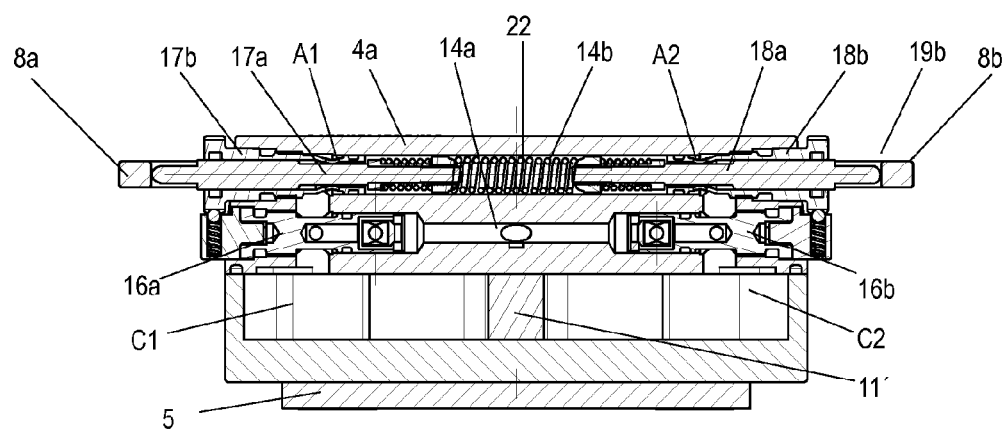
FIG. 7 shows the valve arrangement according to a second embodiment.

FIG. 7 illustrates an alternative embodiment of the valve arrangement 15. In this embodiment, the link 19a, 19b that couples together the drivers 8a, 8b and the first and the third main valve part 17a, 18a has been removed and replaced by one or several spring elements 22. The end of the first and the third main valve part 17a, 18a facing the respective driver 8a, 8b has a semispherical configuration in order to be able to accommodate certain lateral movements. The spring element 22 is located between the first main valve part 17a and the third main valve part 18a so that the spring element 22 creates a pressing force on both of the valve parts 17a, 18a and ensures that the first and the third main valve part 17a, 18a is pressed against the driver 8a, 8b with no play. Otherwise, the valve arrangement in FIG. 7 is substantially identical to the valve arrangement in FIG. 6.

Figure 8A:
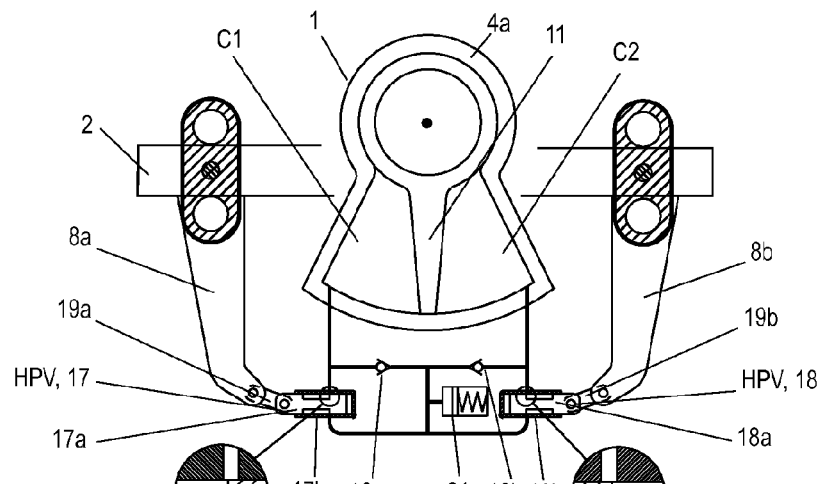
FIG. 8a shows the function of the steering damper when the vehicle is driven straight forward and no disturbances act on the steering means.
Figure 8B:
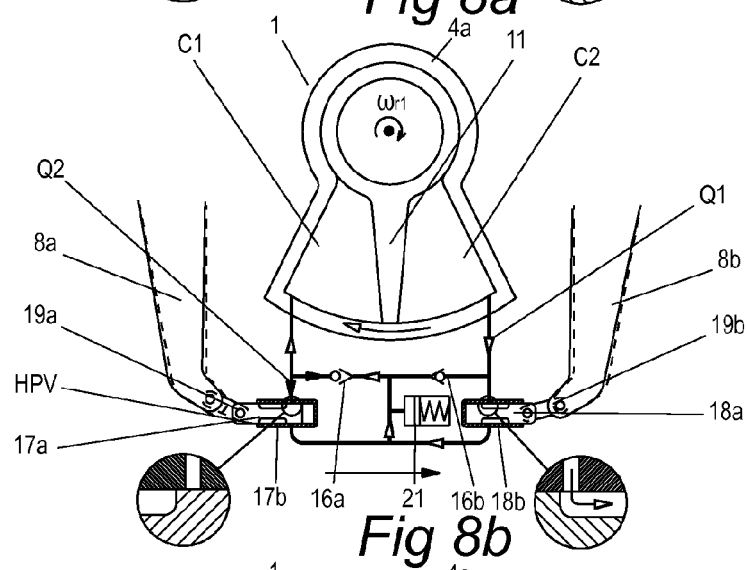
FIG. 8b shows the function of the steering damper when the driver actively steers to the right or when a disturbance acts on the steering means from the left.
Figure 8C:
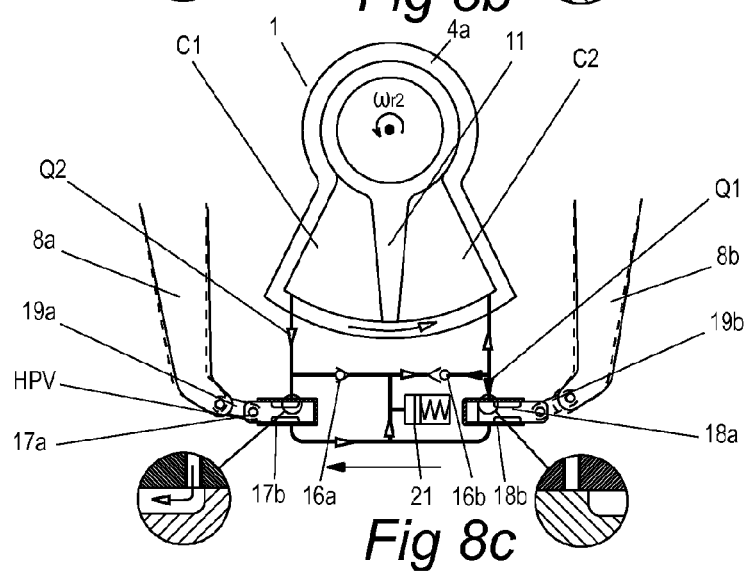
FIG. 8c shows the function of the steering damper when the driver actively steers to the left or when a disturbance acts on the steering means from the right.

In FIGS. 8a-8c the function of the steering damper is shown in more detail. In all of the figures, the damping chambers C1, C2 are hydraulically coupled together by means of the damping channel 14 and the flow between the chambers is delimited by the main valves HPV, i.e. 17, 18, and blocked by non-return valves 16a, 16b. The non-return valves 16a, 16b are positioned in series with the main valves 17, 18 in the damping channel 15 and prevent the flow in the respective flow direction Q1, Q2, which is determined by the rotational direction of the steering damper. According to a known construction, a pressurization reservoir 21 can be positioned in series with the main valves 17, 18 and the non-return valves 16a, 16b. The pressurization reservoir 21 ensures that at least a base pressure always is present in the damping chambers C1, C2 and that volume changes in the hydraulic fluid can be absorbed. The pressurization reservoir 21 is located such that if there is a higher pressure in the pressurization reservoir 21 than in the damping chambers C1, C2, the reservoir 21 is always coupled together with respective damping chambers C1, C2 via the non-return valves 20a, 20b.

FIG. 8a shows the function of the steering damper when the vehicle is driven straight forward and no disturbances are acting on the steering means 2, that are neither caused by the driver nor the configuration of the ground. The moveable delimiting part 11 of the steering damper is located such that the damping chambers C1, C2 are basically equally large. The opening between the first and the second valve part is open and a flow of hydraulic fluid can run between the damping chambers C1, C2 via the main valves 17, 18.

FIG. 8b shows the function of the steering damper when the driver is actively steering to the right, i.e. in the first direction $\omega_{r1}$. The damping housing 4a is turned with the handlebar 2 to the left in the figure in relation to the delimiting part 11 so that the volume of the second damping chamber C2 decreases. The possible initial rotation between the handlebar 2 and the attaching part 5 causes the drivers 8a, 8b to affect the main valves 17, 18 such that the first main valve 17 closes and the second main valve 18 opens. The hydraulic fluid flows between the damping chambers C2 and C1 in the direction Q1, also see the black/white arrow, via the channel 14 and through the completely open opening between the third and fourth main valve parts 18a, 18b of the second main valve 18. When a disturbance S1 that causes the wheel to turn to the left acts on the wheel, the flow Q2 of hydraulic fluid through the channel 14, also see the completely black arrow, is stopped both by the completely closed first main valve 17 and the first non-return valve 16a.

FIG. 8c shows the function of the steering damper when the driver is actively steering to the left or when a disturbance acts on the steering means from the right, i.e. in the second direction $\omega_{r2}$. The damping housing 4a is turned with the handlebar 2 to the right in the figure in relation to the delimiting part 11 so that the volume of the first damping chamber C1 decreases. In this case, the initial rotation causes the drivers 8a, 8b to affect the main valves 17, 18 such that the second main valve 18 closes and the first main valve 17 opens. The hydraulic fluid flows between the damping chambers C1 and C2 in the direction Q2, see also the completely black arrow, via the channel 14 and through the completely open opening between the first and second main valve parts 17a, 17b of the first main valve 17. When a disturbance S2 that causes the wheel to turn to the right acts on the wheel, the flow Q1 of hydraulic fluid through the channel 14, also see the black/white arrow, is stopped both by the completely closed second main valve 18 and the second non-return valve 16b.

When the first and the second main valve 17, 18, respectively, is open, i.e. when the turning motion of the handlebar is caused by the driver, the hydraulic fluid basically flows freely between the damping chambers C1, C2 with no restriction and no damping of the steering motion takes place but the vehicle reacts just as quickly as if no steering damper were mounted. If a certain amount of damping is also desired when steering it may be achieved by an adjustment of the position of the first and second main valve parts 17a, 17b; 18a, 18b relatively each other. When shocks and impacts causes the wheel to be turned against the driver's will, the motion of the handlebar is blocked or strongly damped in the undesired turning direction as the main valves 17, 18 in that direction are closed and the flow between the damping chambers C1, C2 is prevented.

Figure 9:
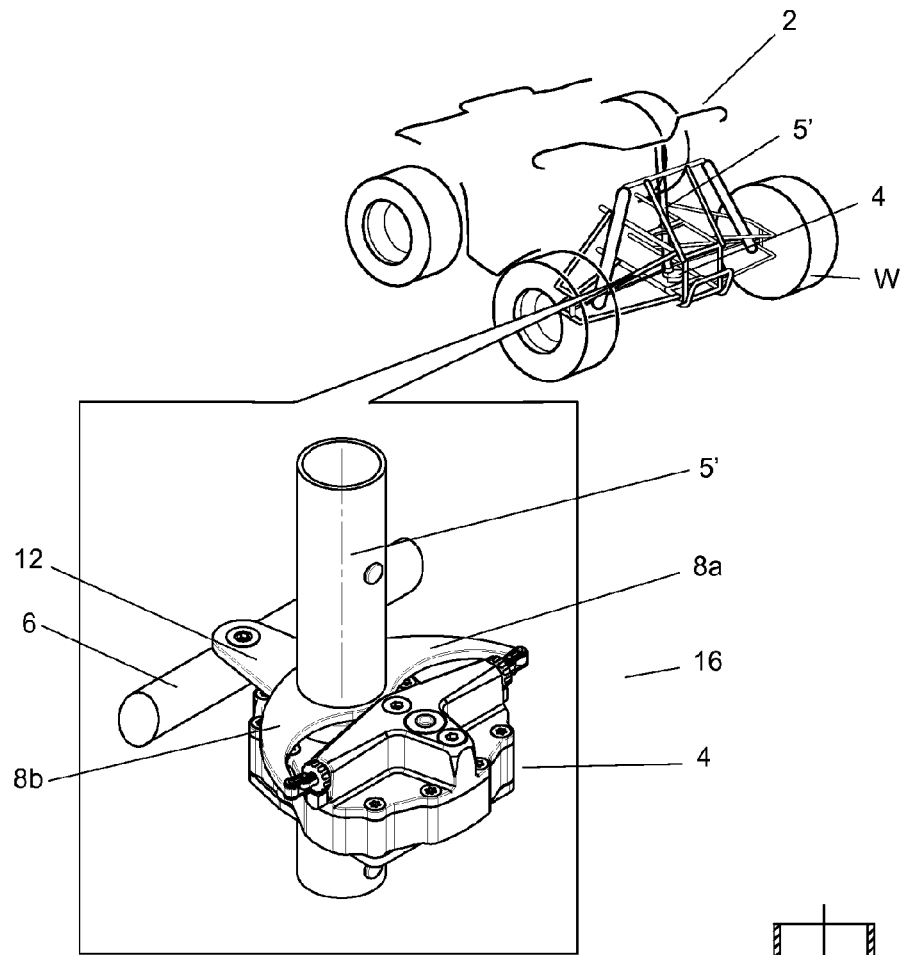
FIG. 9 is a view of the steering damper according to the present invention arranged on a four-wheeled ATV.
Figure 10:
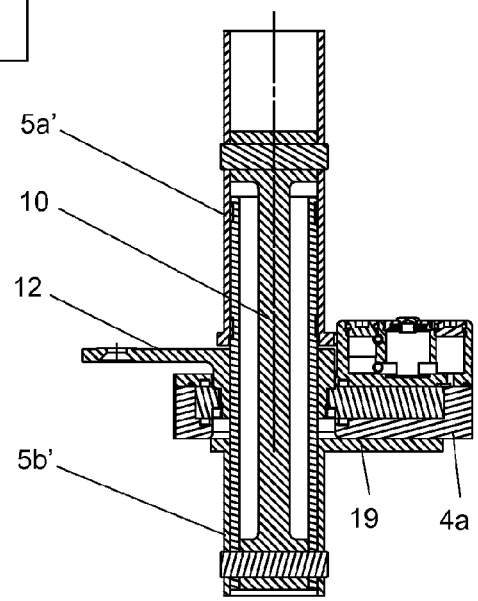
FIG. 10 is a sectional view of the steering damper mounted on an ATV.

FIGS. 9 and 10 illustrate the location of the steering damper on a four-wheeled ATV. In this embodiment, the damping housing 4a is fixed to an attaching part 5 in the form of a cylinder 5' arranged concentrically around the steering axis. The cylinder 5' is divided into an upper and a lower part 5a', 5b' coupled together by means of an elastic holding-up means 10. The upper cylinder part 5a' is coupled together with the steering device 2, and the lower cylinder part 5b' is coupled together with the wheels 3 via one or several wheel suspension parts. In this embodiment the steering damper 4 is mounted in the lower cylinder part 5b' but the steering damper can also be mounted in the upper cylinder part 5a'. The steering damper housing 4a is fixed to a flange 19 protruding from the cylinder part 5b', and hence moves together with the lower cylinder part 5b'. In this case, the delimiting part 8 that is moveable in the damping housing 4a is coupled together with the fixed chassis parts 6 of the vehicle via the lever 12 so that the delimiting part 8 and the damping housing 4a move in relation to each other.

Of course, a linear steering damper such as the one shown in FIG. 4b can also be used in ATV applications.

Figure 11:
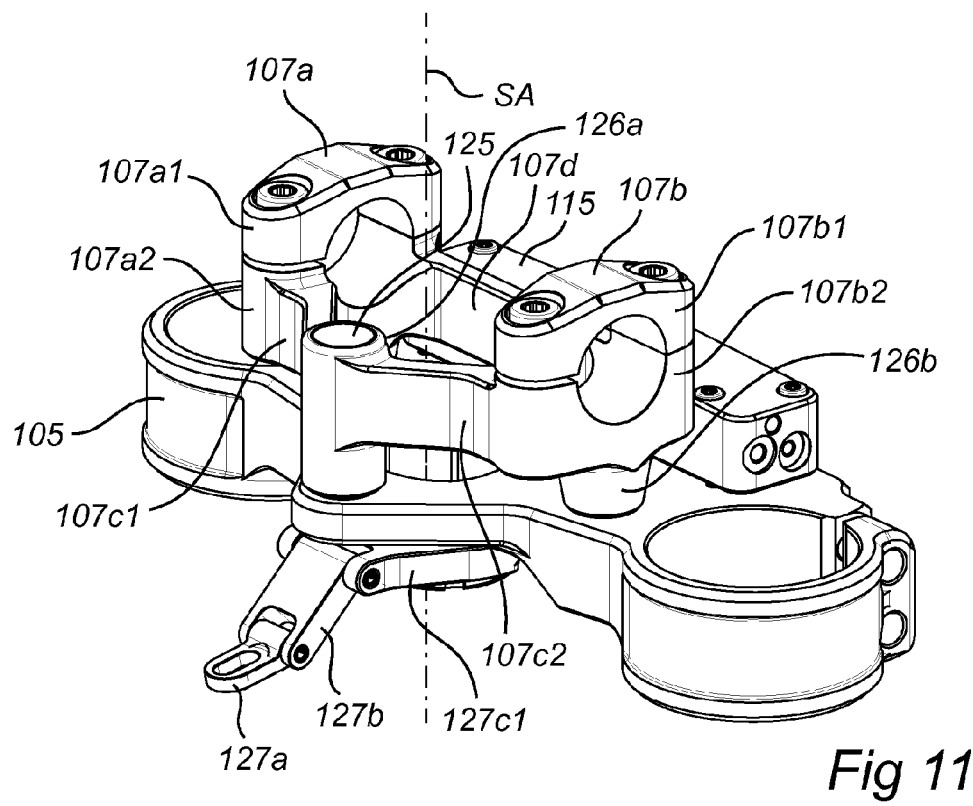
FIG. 11 is a view of an embodiment of the device comprising a torsion bar.

FIG. 11 shows a view of an embodiment suitable for use on, for example, a motorcycle. The attaching part 105 in this embodiment has the shape of a fork crown. The fork crown is of the triple clamp type which means that two front forks are attachable to the fork crown at either ends and a steering column is attachable in between said front forks. The fork crown 105 is rotatable about a steering axis SA, coinciding with the axis of a steering column when attached thereto. A steering device in the form of a handlebar is attachable in the fork crown 105 by means of a first attachment means 107a and second attachment means 107b. The attachment means 107a, 107b comprise two parts; an upper 107a1, 107b1 and a lower 107a2, 107b2, between which a handlebar is clampable. The attachment means 107a, 107b are coupled together via bars 107c, 107d. The first bar, 107c is divided into two parts, 107c1, 107c2 between which a torsion bar 125 is disposed. The torsion bar 125 is attached in its upper end to the first bar 107c and it its lower end to the fork crown 105. In other embodiments, a silent block bush or a bearing is used instead of the torsion bar 125. The attachment means 107a, 107b are attached to the fork crown 105 via two elements 126a, 126b. The elements 126a, 126b are slidably arranged in openings in the fork crown 105 between two end surfaces of the openings, i.e. the elements 126a, 126b are slidably arranged between two end positions defined by these end surfaces. The openings are larger in size relative to the elements, thereby allowing a slidable operation. In other embodiments, the elements 126a, 126b are arranged in slots or holes in the fork crown 105. The elements 126a, 126b are attached to the fork crown 105 and the attaching part. Thereby, the attachment means are limited to rotational movement relative to the fork crown 105. On top of the fork crown 105 adjacent to the attachment means 107a, 107b, a main valve unit 115 is arranged. The torsion bar 125 may be arranged to be releasably connectable, mountable or replaceable, thus providing the possibility for a vehicle user or a mechanic or the like to replace the torsion bar 125 with another torsion bar with different characteristics such as different elasticity thereby adjusting the response time of the steering damping.

Figure 12:
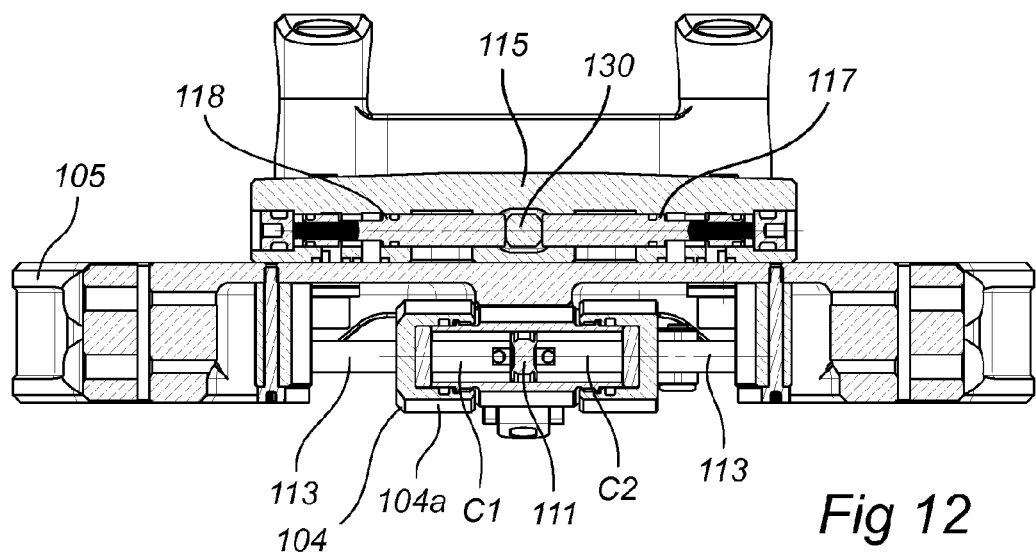
FIG. 12 is a sectional view of the steering damper in FIG. 11.
Figure 13:
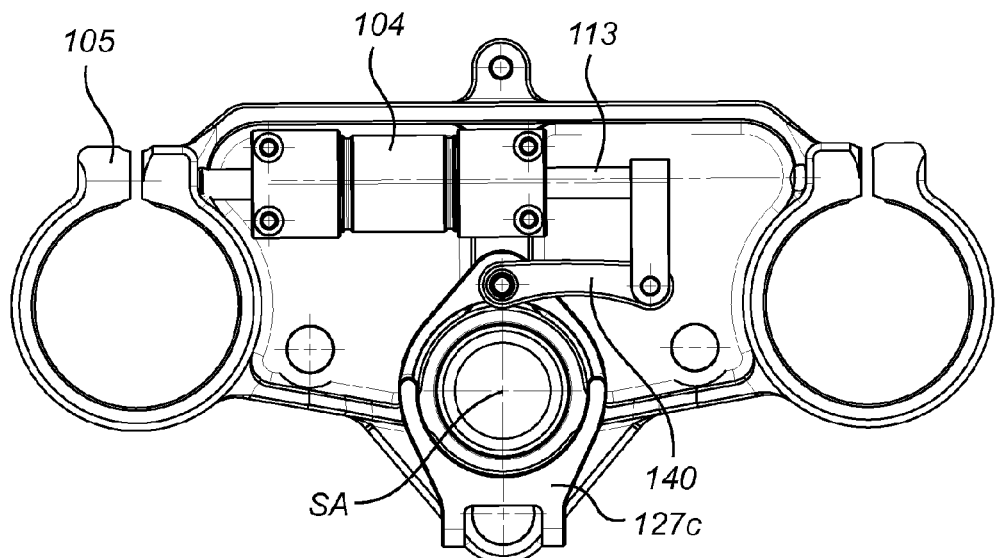
FIG. 13 is a view of an embodiment of the device comprising a linear steering damper.

FIG. 12 shows a sectional view of the device in FIG. 11. The sectional view is shown along a cross section of the main valve unit 115 and the steering damper 104. The main valve unit 115 is arranged on top of the fork crown 105 and the steering damper 104 is arranged substantially in parallel with the main valve unit 115 mostly inside the fork crown 105, extending partly through the bottom of the fork crown 105. The main valve unit 115 comprises a first and a second valve unit 117, 118. A valve actuator 130, being coupled to the attachment means 107a, 107b via the bar 107d, extends into the main valve unit 115. The steering damper 104 is of the linear damping type comprising a piston 111 partitioning the interior of the damping housing 104a, i.e. the damping chamber, into two damping chambers C1 and C2. The piston 11 is attached to a piston rod 113 which extends through the steering damper 104. The piston rod 113 is attached in both ends to the fork crown 105. In other embodiments, the piston rod may be attached in one end only. FIG. 13 shows a view from beneath of an embodiment of the present invention. The attaching part is in the form of a fork crown 105. The housing of the linear steering damper 104 is attached to the fork crown 105, and the piston rod 113 is coupled via a link bar 140 to the rotating link 127c which in turn is attachable to the frame of the vehicle when mounted thereto.

Figure 14:
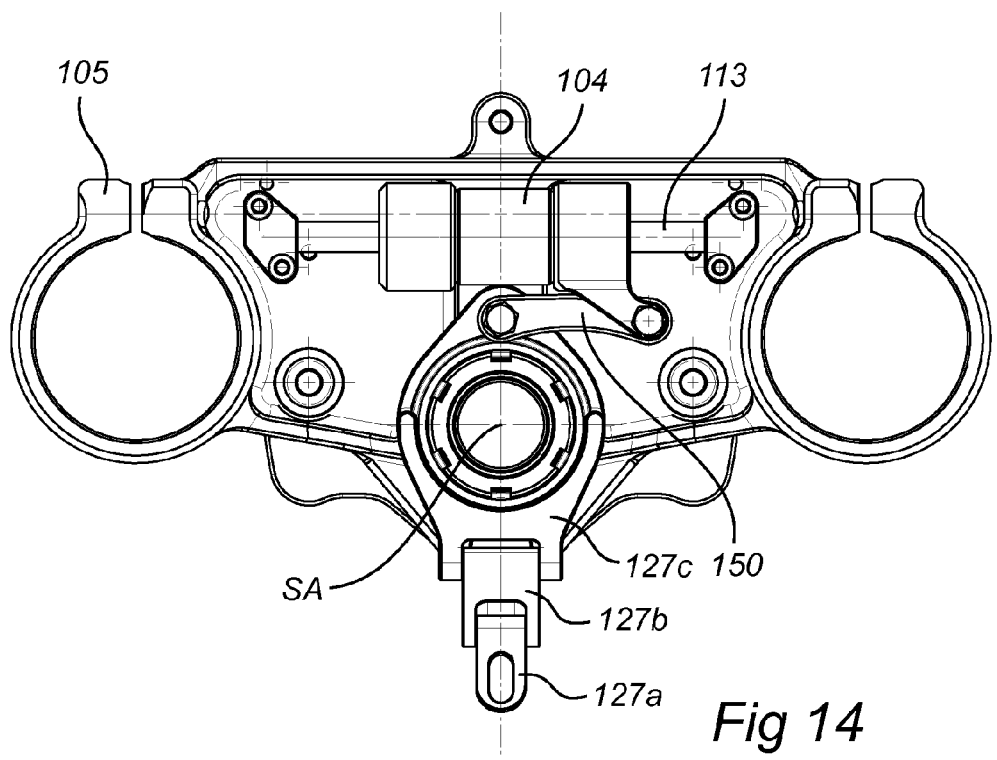
FIG. 14 is a view of another embodiment of the device comprising a linear steering damper.

FIG. 14 shows a view from beneath of an embodiment of the present invention. The attaching part is in the form of a fork crown 105. The housing of the linear steering damper 104 is coupled via a link bar 150 to the rotating link 127c which in turn is attachable to the frame of the vehicle via the links 127a, 127b when mounted thereto. The piston rod 113 extends through the steering damper 104, and the piston rod is attached in both ends to the fork crown 105. In another embodiment, at least one of the links 127a, 127b, 127c, 140 or 150 may be configured such that at least one of the links breaks if the damping force of the steering damper is higher than a predetermined value. Thereby, damages to the part(s) of the vehicle arranged for contacting ground or to the steering damper 104 may be avoided. The predetermined maximum value of the damping force may be exceeded during, for example, an accident when high forces are applied to the part(s) arranged for contacting the ground. Another example when the maximum damping force may be exceeded is during malfunction of the valve unit which controls hydraulic fluid flow between the working chambers of the steering damper 104, i.e. when hydraulic fluid flow between the working chambers is essentially prevented. Furthermore, the damping characteristics may be adjusted by adjusting the ratios in the linkage, i.e. by varying the lengths and/or dimensions of the links 127a, 127b, 127c, 140 or 150.

Figure 15:
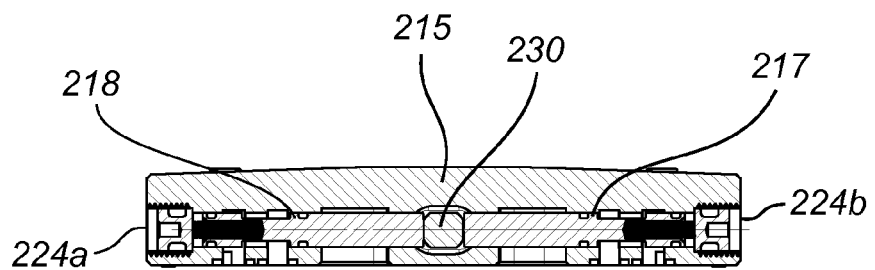
FIG. 15 is a sectional view of a mechanically actuatable main valve unit.

FIG. 15 shows a main valve unit 215 which may be used in embodiments such as exemplified in FIG. 11 or 12. The main valve unit 215 comprises two main valves 217, 218 being actuatable by a valve actuator 230. Thus, the main valve unit 215 has a first valve member 230 and a second valve member 217, 218. Two valve adjustment means 224a, 224b are arranged at either end of the main valve unit, such that the damping characteristics of the main valves 217, 218 may be externally adjusted.

Figure 16:
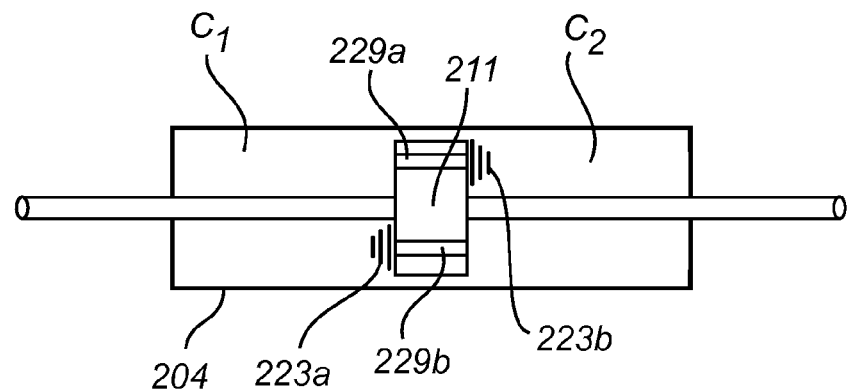
FIG. 16 is a sectional view of a linear steering damper comprising pressure limiting valves.

FIG. 16 shows a sectional view of a steering damper 204. A piston 211 divides the damper volume into first and second working chambers C1 and C2. The piston 211 comprises through holes 229a, 229b and pressure limiting valves 223a, 223b arranged on either said of the piston such that the pressure in the working chambers C1 and C2 is limited to a predetermined maximum value. The predetermined maximum value may be in the range of 30-100 bars. Thereby, the maximum damping force is limited in order to avoid damaging the part(s) of the vehicle arranged for contacting ground and the steering damper. The predetermined maximum value of the working chamber pressure may be exceeded during, for example, an accident when high forces are applied to the part(s) arranged for contacting the ground. Another example when the predetermined maximum value of the pressure may be exceeded is during malfunction of the valve unit which controls hydraulic fluid flow between the working chambers of the steering damper 104, i.e. when hydraulic fluid flow between the working chambers is essentially prevented. The pressure limiting valves 223a and 223b may be arranged to affect the damping characteristics of the steering damper at working chamber pressures lower than the predetermined maximum value. Thereby an additional degree of freedom for customizing the damping characteristics during normal operation is achieved. The pressure limiting valves 223a and 223b may be of the disc-valve type. In yet another embodiment, the main valve 215, such as exemplified in FIG. 15 comprises a pressure limiting valve coupled in parallel to the first and second valve units 217 and 218, i.e. between the working chambers C1 and C2 such that the pressure in the working chambers C1 and C2 is limited to a predetermined maximum value. The predetermined maximum value may be in the range of 30-100 bars.

Figure 17:
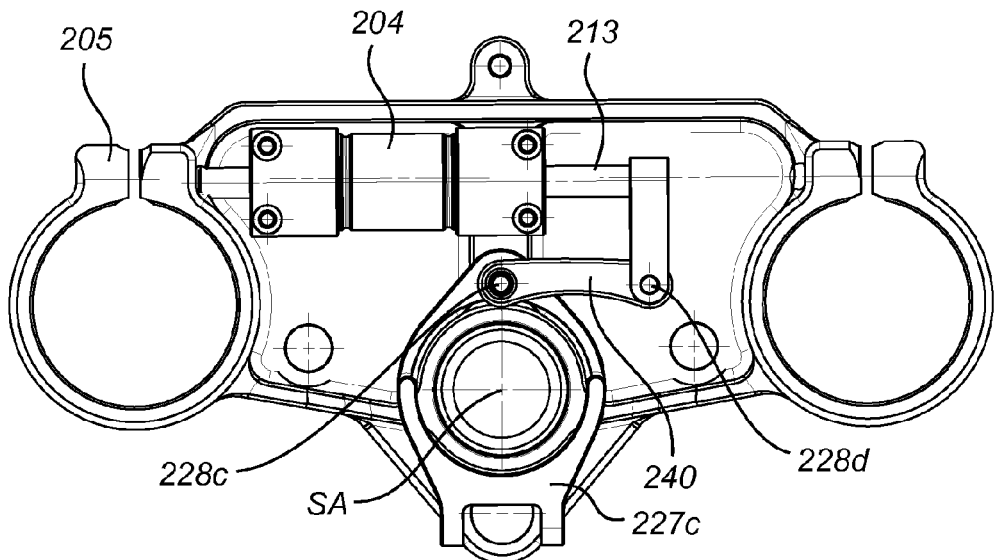
FIG. 17 is a view of yet another embodiment of the device comprising a linear steering damper.

FIG. 17 shows a view from beneath of an embodiment of the present invention. The attaching part is in the form of a fork crown 205. The housing of the linear steering damper 204 is attached to the fork crown 205, and the piston rod 213 is coupled via a link bar 240 to the rotating link 227c which in turn is attachable to the frame of the vehicle when mounted thereto. The link bar 240 is attached to the piston rod with a bolt 228d and to the rotating link 227c with a bolt 228c. In other embodiments, the bolts 228c, 228d may be pins or studs.

At least one of the bolts 228c, 228d have a reduced strength and may be adapted to break if the damping force of the steering damper is higher than a predetermined value. Thereby, damages to the part(s) of the vehicle arranged for contacting ground and/or to the steering damper 204 may be avoided. The predetermined maximum value of the damping force may be exceeded during, for example, an accident when high forces are applied to the part(s) arranged for contacting the ground. Another example when the maximum damping force may be exceeded is during malfunction of the valve unit which controls hydraulic fluid flow between the working chambers of the steering damper 204, i.e. when hydraulic fluid flow between the working chambers is essentially prevented.

Furthermore, the characteristics of the damping of the rotational movement of the steering device and/or wheel arrangement relative the chassis of the vehicle may be adjusted by adjusting the ratios in the linkage, i.e. by varying the lengths and/or dimensions of the links 227c, 240.

Figure 18:
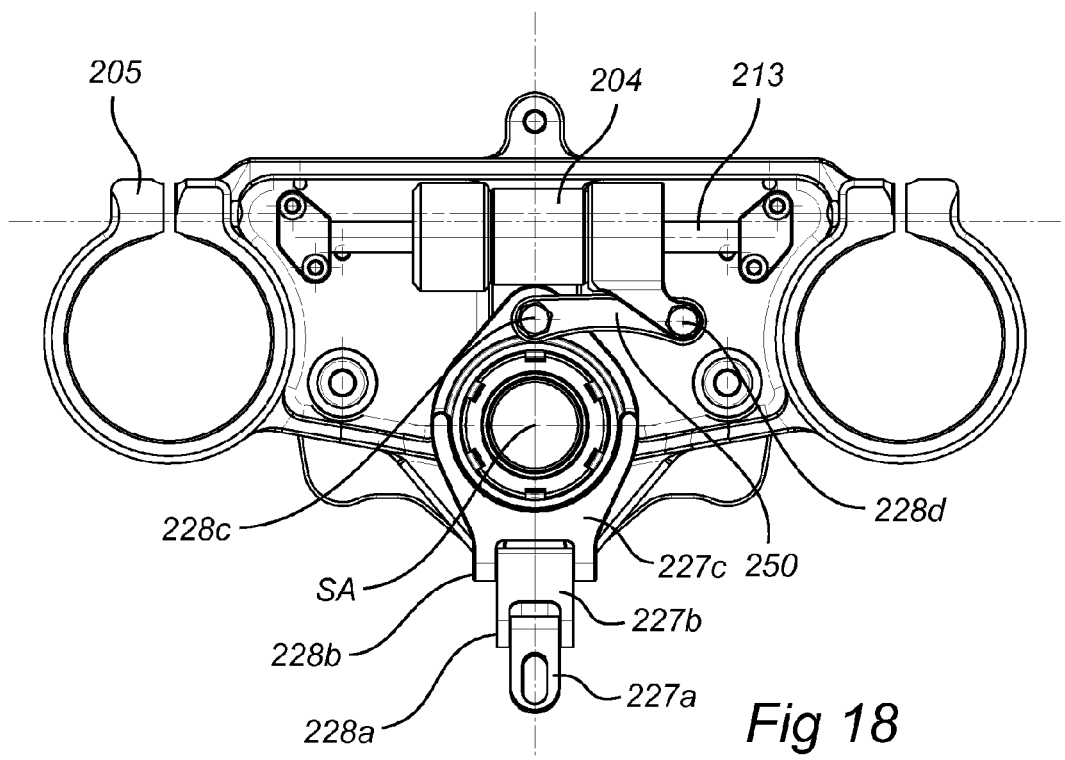
FIG. 18 is a view of yet another embodiment of the device comprising a linear steering damper.

FIG. 18 shows a view from beneath of an embodiment of the present invention. The attaching part is in the form of a fork crown 205. The housing of the linear steering damper 204 is coupled via a link bar 250 to the rotating link 227c which in turn is attachable to the frame of the vehicle via the links 227a, 227b when mounted thereto. The piston rod 213 extends through the steering damper 204, and the piston rod is attached in both ends to the fork crown 205. At least one of the bolts or pins 228a, 228b, 228c, 228d attaching the links 227a, 227b, 227c, 250 together with each other or with the steering damper have a reduced strength to break if the damping force of the steering damper is higher than a predetermined value. Thereby, damages to the part(s) of the vehicle arranged for contacting ground or to the steering damper 204 may be avoided. The predetermined maximum value of the damping force may be exceeded during, for example, an accident when high forces are applied to the part(s) arranged for contacting the ground. Another example when the maximum damping force may be exceeded is during malfunction of the valve unit which controls hydraulic fluid flow between the working chambers of the steering damper 204, i.e. when hydraulic fluid flow between the working chambers is essentially prevented.

Furthermore, the damping characteristics may be adjusted by adjusting the ratios in the linkage, i.e. by varying the lengths and/or dimensions of the links 227a, 227b, 227c, 250.

Figure 19:
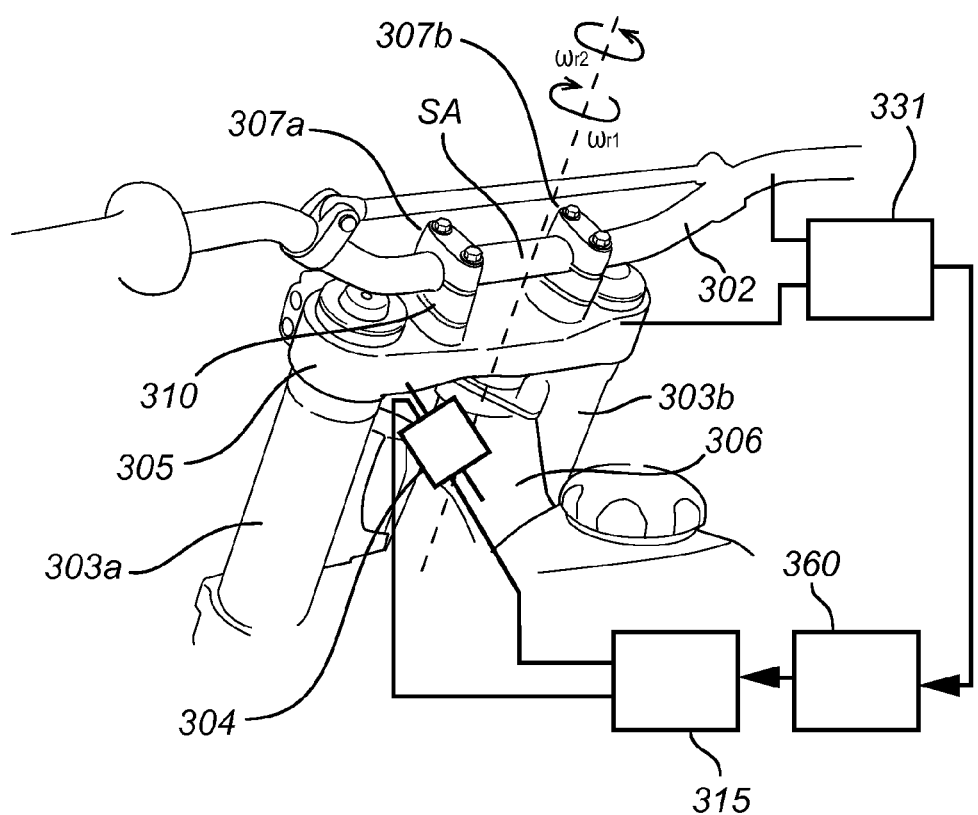
FIG. 19 is a view of yet another embodiment of the invention comprising an electronic sensor and an electrically controlled main valve unit.

FIG. 19 shows a view of yet another embodiment of the present invention. The second element 305 in this embodiment has the shape of a fork crown. However, it is understood that the second element may be of a different configuration or shape. The fork crown 305 is of the triple clamp type which means that two front forks are attachable to the fork crown 305 at either ends and a steering column is attachable in between said front forks. The fork crown 305 is rotatable about a steering axis SA, coinciding with the axis of a steering column when attached thereto. A steering device in the form of a handlebar is attachable in the fork crown 305 by means of a first element 307a and 307b. The first element 307a, 307b are attached to the fork crown 305 via two elastic members 310, such that a relative rotational movement is allowed between the first element and the fork crown. An electronic sensor in the form of an electronic sensor or potentiometer 331 is coupled to the second element or fork crown 305 and to the steering device 302 and is arranged for measuring relative rotation there between. In other embodiments, the electronic sensor 331 may be coupled to the first and second elements, achieving the same technical effect, i.e. measuring relative rotation between the second element and the steering device. The electronic sensor 331 may be a hall effect sensor or an optical sensor in other embodiments. The electronic sensor 331 is electrically coupled to an ECU 360. The ECU 360 is also electrically coupled to an electrically controlled main valve unit 315. The electrically controlled main valve unit 315 is hydraulically coupled to a steering damper 304 such that the flow of hydraulic fluid between the working chambers of the steering damper 304 may be controlled by the ECU in response to a signal from the electronic sensor 331 reflecting relative movement between the first element 307a, 307b and the second element 305. The steering damper 304 is mechanically coupled to the fork crown 305 and to the chassis 306 of the vehicle such that rotational movement of the fork crown 305 relative to the chassis 306 of the vehicle may be damped. The steering damper 304 may be a linear hydraulic damper comprising a piston and piston rod arrangement. In other embodiments, the steering damper 304 may be a rotational wing damper. In yet other embodiments, the main valve unit 315 may be coupled to the first element 307a, 307b or directly to the steering device 302. The electrically controlled main valve unit 315 may be arranged on top of the fork crown 305, underneath the fork crown 305 or separately from the fork crown 305, for example on the part(s) arranged for contacting the ground such as the front fork of a motorcycle or on the chassis 306 of the vehicle. In yet another embodiment, the electrically controlled main valve unit 315 may be integrated with a steering damper which may be arranged underneath the fork crown 305. The electrically controlled main valve unit 315 has a functional structure analogous to the embodiment shown in FIG. 8, except that the main valves 315 are electrically controlled instead of being mechanically actuated. The main valves 315 are controlled by pilot valves which are actuated by electrically controlled solenoids or other electrically controlled devices such as for example an electric motor. In other embodiments, the electrically controlled main valve unit 315 may comprise a main valve for adjusting the flow of hydraulic fluid between the working chambers which is directly actuated by actuating means such as for example a solenoid or an electric motor. In yet another embodiment, the electrically controlled main valve unit 315 may comprise an electromagnet for controlling the flow of a magnetorheological fluid through the main valve unit by means of a magnetic field.

Figure 20A:
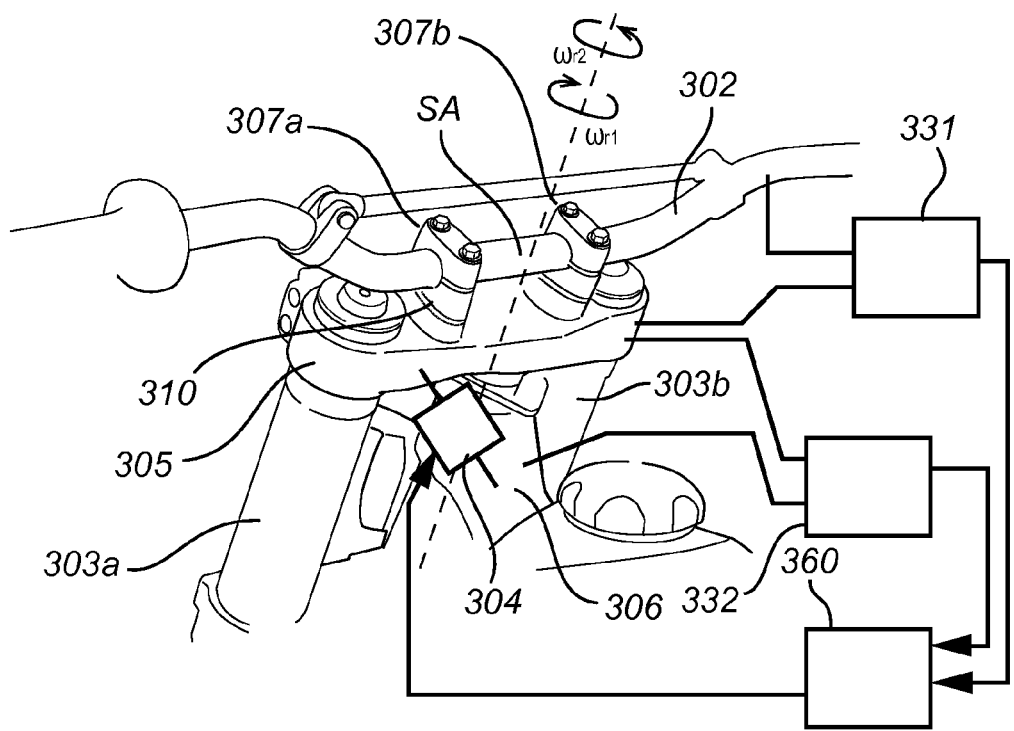
FIG. 20a is a view of yet another embodiment of the invention comprising electronic sensors and an electrically controlled damper unit.

FIG. 20a shows a view of yet another embodiment of the present invention suitable for use on a motorcycle, for example. The second element 305 in this embodiment has the shape of a fork crown. The fork crown is of the triple clamp type which means that two front forks are attachable to the fork crown at either ends and a steering column is attachable in between said front forks. The fork crown 305 is rotatable about a steering axis SA, coinciding with the axis of a steering column when attached thereto. A steering device in the form of a handlebar is attachable to the fork crown 305 by means of a first element 307a and 307b. The first element 307a, 307b are attached to the fork crown 305 via two elastic members 310, such that a relative rotational movement is allowed between the first element 307a, 307b and the fork crown 305. A first electronic sensor 331 is coupled to the first element 307a, 307b and the steering device and is arranged for measuring relative rotation there between. In other embodiments, the electronic sensor 331 may be coupled to the first and second elements, achieving the same technical effect, i.e. measuring relative rotation between the second element and the steering device. A second electronic sensor 332 is coupled to the fork crown 305 and to the chassis 306 of the vehicle and is arranged for measuring relative rotation between the chassis 306 of the vehicle and the fork crown 305. In this embodiment, the first and second electronic sensors 331, 332 are potentiometers. The electronic sensors 331, 332 may be Hall Effect sensors or optical sensors in other embodiments. The electronic sensors 331, 332 are electrically coupled to an ECU 360. The ECU 360 is also electrically coupled to an electrically controlled damper unit 304, such that the damping of the damper unit 304 may be controlled by the ECU 360 in response to signals from the electronic sensors 331, 332. The electrically controlled damper unit 304 is mechanically coupled to the fork crown 305 and to the chassis 306 of the vehicle such that rotational movement of the fork crown 305 relative to the chassis 306 of the vehicle may be damped. In other embodiments, the electrically controlled damper unit 304 may be coupled to the first element 307a, 307b or directly to the steering device 302. The electrically controlled damper unit 304 may be arranged on top of the fork crown 305, underneath the fork crown 305 or separately from the fork crown 305, for example on the part(s) arranged for contacting the ground such as the front fork of a motorcycle or on the chassis of the vehicle. The electrically controlled damper unit 304 is a linear hydraulic damper comprising a valve arrangement in its piston. The valve arrangement comprises a pilot valve which is electrically actuated using for example a solenoid. The pilot valve is used to control a main valve of the valve arrangement which in turn adjusts the flow of hydraulic fluid between the working chambers in the damper unit 304. Such a damper unit using an electrically controlled pilot valve is well known for the person skilled in the art, and is commonly referred to as a CES damper, and no further details regarding its construction will thus be given here. In other embodiments, the valve arrangement may comprise a main valve for adjusting the flow of hydraulic fluid between the working chambers which is directly actuated by actuating means such as for example a solenoid or an electric motor. In yet another embodiment, the electrically controlled damper unit 304 may comprise a valve arrangement which is arranged radially outside the walls of the damping cylinder or axially above or below the working chambers of the damper unit. In yet another embodiment, the damper unit 304 may be a magnetorheological damper being filled with a magnetorheological fluid, wherein the damping properties of the damper unit is electrically controlled by a magnetic field provided by an electromagnet for example. The electromagnet may be arranged in the piston of the damper unit such that the flow through the through-hole equipped piston may be electrically controlled. Such a magnetorheological damper unit is also well known for the person skilled in the art, and no further details regarding its construction will thus be given here. In yet another embodiment, the damper unit 304 may be of the electromechanical type comprising at least one electric motor and means for transforming the rotational movement of the motor to axial movement such that the damping properties of the damper unit may be adjusted by electrically actuating the motor. Such an electromechanical damper unit is also well known for the person skilled in the art, and no further details regarding its construction will thus be given here. In yet another embodiment, the damper unit 304 may be a friction damper which may comprise electrically actuatable means for adjusting the abutment between the friction elements of the friction damper.

Figure 20B:
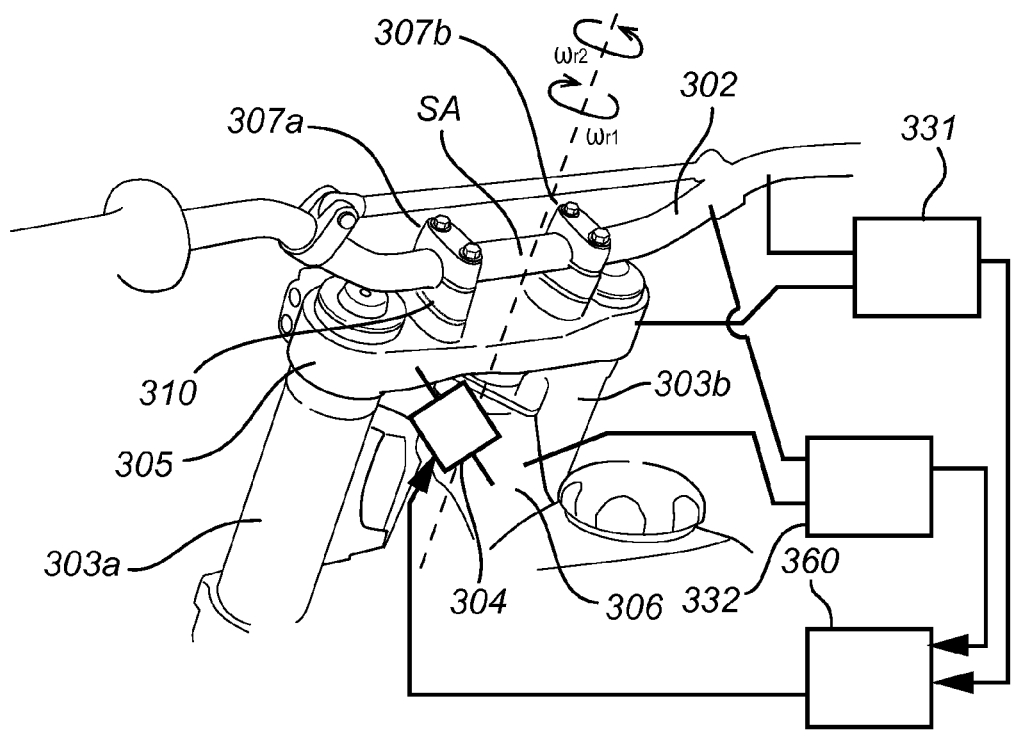
FIG. 20b is a view of yet another embodiment of the invention comprising electronic sensors and an electrically controlled damper unit.

FIG. 20b shows a view of an embodiment as shown in FIG. 20a, except that the second electronic sensor 332 is coupled to the steering device 302 instead of being coupled to the fork crown 305. In yet another embodiment, the second electronic sensor 332 is coupled to the first element 307a, 307b and to the chassis of the vehicle 306.

Figure 21A:
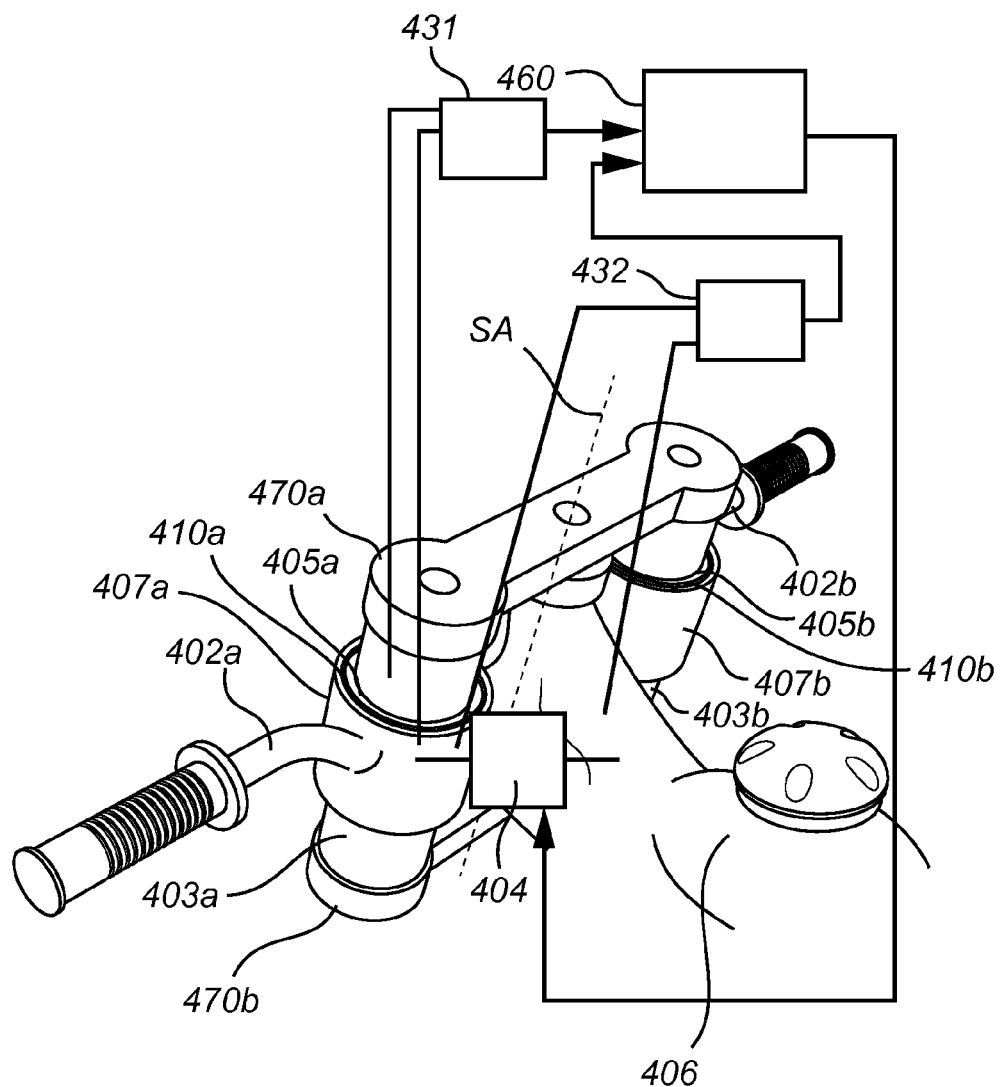
FIG. 21a is a view of yet another embodiment of the invention comprising electronic sensors and an electrically controlled damper unit.

FIG. 21a shows a view of an embodiment of the present invention fitted on the front fork 403a, 403b of a motorcycle. The second element 405a, 405b in this embodiment has the shape of cylindrical sleeves being attached to the front fork 403a, 403b. A steering device in the form of two separate handlebars 402a, 402b is connectable to the second elements 405a, 405b via first elements 407a and 407b. The first and second elements 407a, 407b, 405a, 405b are rotatable about a steering axis SA for adjusting the direction of a wheel being attached to the front fork 403a, 403b. The first and second elements 407a, 407b, 405a, 405b are coupled together by means of elastic elements 410a, 410b arranged there between to allow rotational movement between the first and second elements 407a, 407b, 405a, 405b. The elastic elements 410a, 410b may be rubber bushes. In other embodiments, the second element 405a, 405b may be the front fork 403a, 403b itself, i.e. the elastic elements 410a, 410b are arranged directly between the second element 405a, 405b and the front fork. Both of the handles 402a, 402b are connected to the front fork 403a, 403b using first and second elements 407a, 407b, 405a, 405b with elastic elements 410a, 410b there between. In other embodiments, one of the handles 402a, 402b may be unelastically coupled to the front fork 403a, 403b, i.e. without an elastic element. In other embodiments, other means for allowing a relative rotational movement between the first and second elements may be used such as for example a bearing. In such an embodiment, additional means are required to limit the relative rotational movement to a limited initial rotation.

A first electronic sensor 431 is coupled to one of the front forks 403a and to one of the second elements 405a and is arranged for measuring relative rotation there between. In another embodiment, first electronic sensor 431 may be coupled to one of the first elements 407a and to one of the second elements 405a. A second electronic sensor 432 is coupled to one of the first elements 407a and to the chassis 406 of the vehicle and is arranged for measuring relative rotation between the chassis 406 of the vehicle and the steering device 402a. The first and second electronic sensors 431, 432 may be potentiometers. The electronic sensors 431, 432 may be Hall Effect sensors or optical sensors in other embodiments. The electronic sensors 431, 432 are electrically coupled to an ECU 460. The ECU 460 is also electrically coupled to an electrically controlled damper unit 404, such that the damping of the damper unit 404 may be controlled by the ECU 460 in response to signals from the electronic sensors 431, 432. The damper unit 404 is mechanically coupled to one of the first elements 407a and to a portion 406 of the vehicle chassis 406. In other embodiments, the electrically controlled damper unit 404 may be coupled to the other first element 407b which may be unelastically coupled to a fork leg 403b. In yet other embodiments, the electrically controlled damper unit 404 may be coupled to one of the fork holding elements 470a, 470b. In yet other embodiments, the damper unit 404 may be arranged underneath, on top of, or integrated in the upper fork holding element 470a.

Figure 21B:
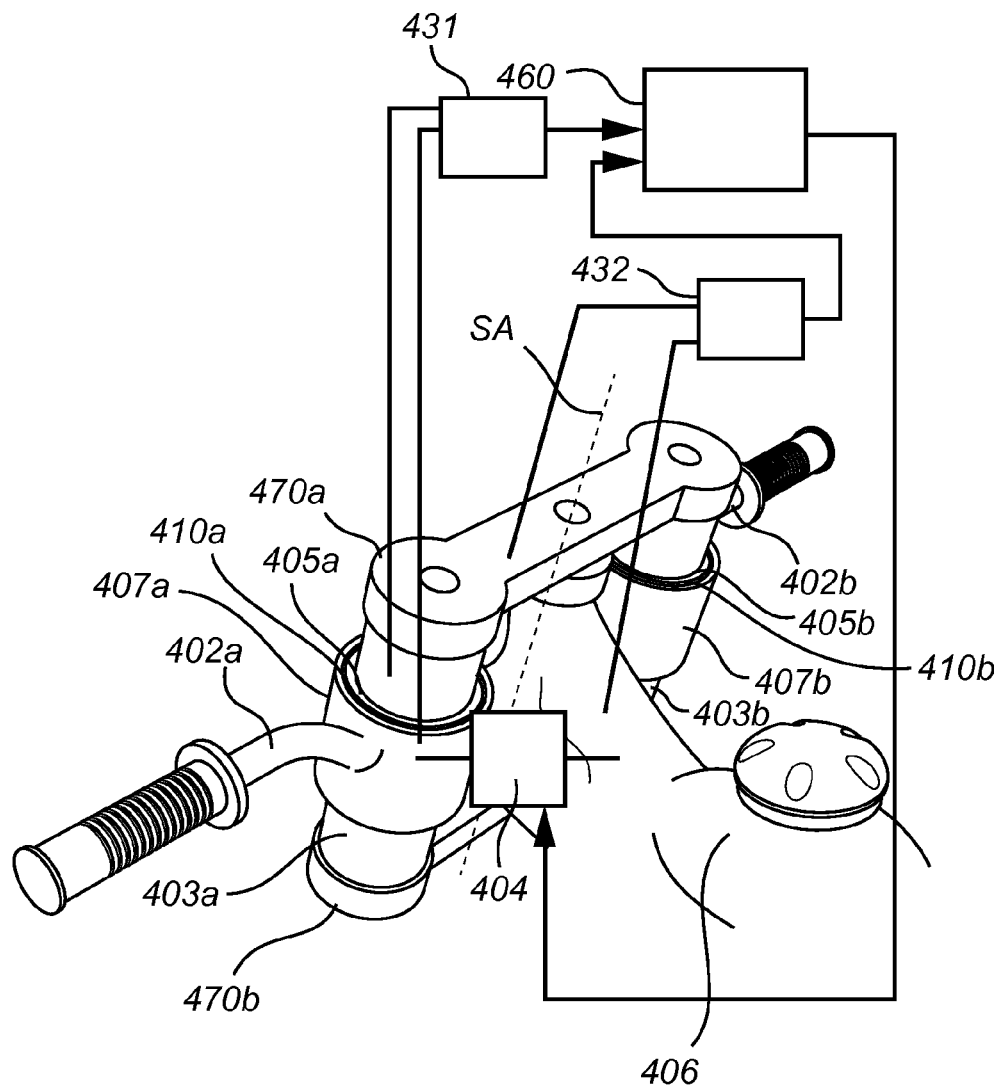
FIG. 21b is a view of yet another embodiment of the invention comprising electronic sensors and an electrically controlled damper unit.

FIG. 21b shows a view of an embodiment as shown in FIG. 21a, except that the second electronic sensor 432 is coupled to fork holding element 470a instead of being coupled to the first element 470a. In yet another embodiment, the second electronic sensor 432 is coupled to one of the second elements 405a, 405b and to the chassis of the vehicle 306.

Figure 21C:
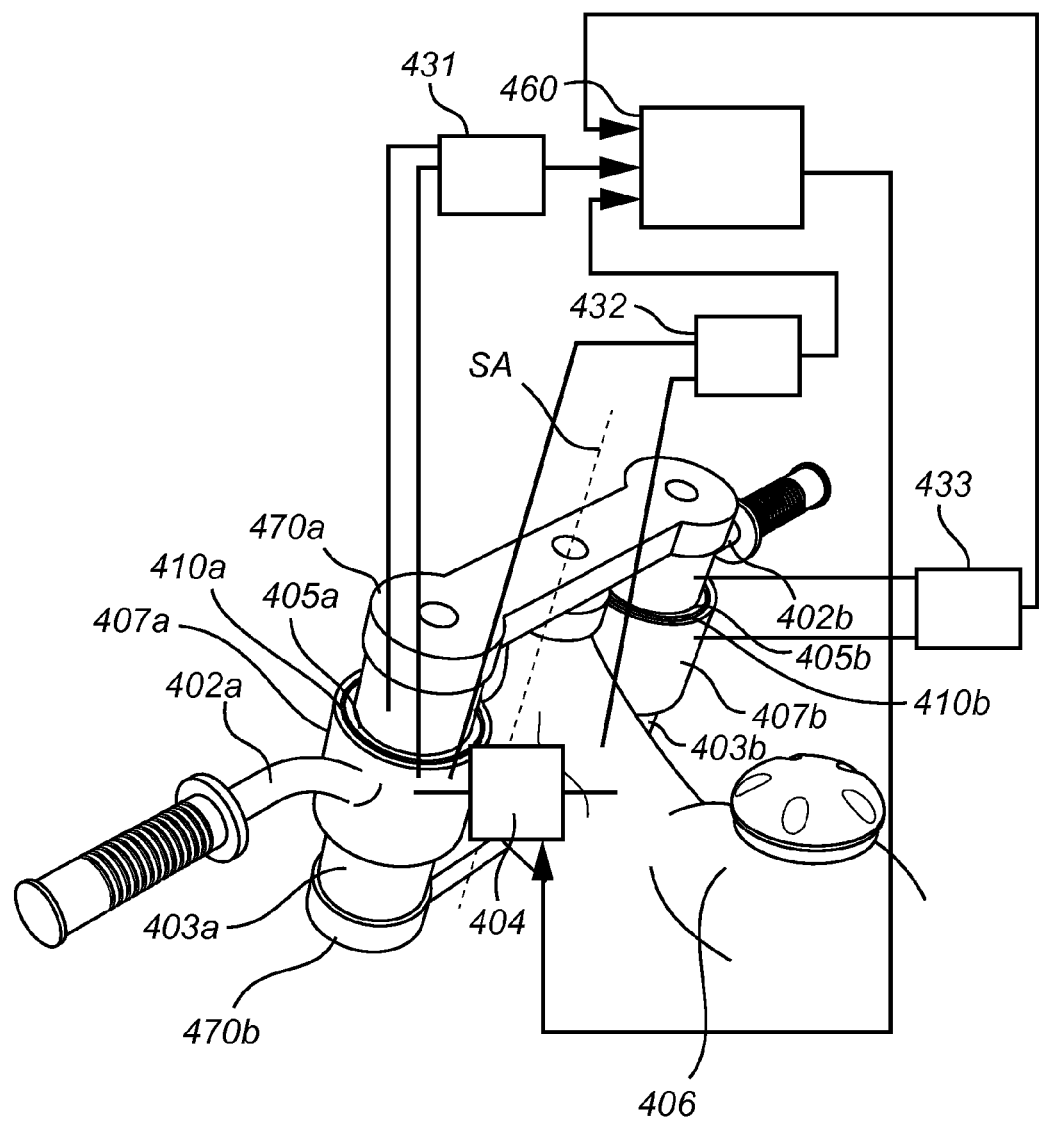
FIG. 21c is a view of yet another embodiment of the invention comprising three electronic sensors and an electrically controlled damper unit.

FIG. 21c shows a view of an embodiment similar to that shown in FIG. 21a, except that a third electronic sensor 433 is used which is coupled to the first element 407b and to the front fork 403b. In another embodiment, the third electronic sensor 433 may be coupled to the first element 407b and to the second element 405b.

In conclusion, a device is disclosed for use in a vehicle for adjusting the rotational damping of a steering device such that the rotational damping varies depending on whether the rotational motion about a steering axis is caused by a force acting on the steering device of the vehicle or a force acting on the part(s) of the vehicle contacting the ground. The device comprises a steering damper comprising a damping housing enclosing a main chamber which comprises hydraulic fluid and is partitioned into a first and a second damping chamber, for example by a delimiting part moveable in relation to the damping housing. The damping housing is fixed on an attaching part that couples together the part(s) of the vehicle contacting the ground with the steering device. The present invention is characterized in that the flow of hydraulic fluid in the steering damper partly or wholly is adjusted by a main valve unit that is coupled together with both the attaching part and the steering device. By means of this coupling the opening area of the main valve unit is determined by a relative motion between the attaching part and the steering device such that the flow of the hydraulic fluid in a direction from and to the respective damping chamber of the steering damper is controlled depending on the cause of the rotational movement.

Although exemplary embodiments of the present invention have been described herein, it should be apparent to those having ordinary skill in the art that a number of changes, modifications or alterations to the invention as described herein may be made. Thus, the above description of the various embodiments of the present invention and the accompanying drawings are to be regarded as non-limiting examples of the invention and the scope of protection is defined by the appended claims. Any reference signs in the claims should not be construed as limiting the scope.

The invention claimed is:

1. A device intended for controlling rotational movement of a steering device and/or a thereto connected wheel arrangement about a steering axis relative to a chassis of a vehicle, the device comprising:
   an attaching part that couples the steering device and the one or more part(s) of the vehicle that are arranged for ground contact such that a limited relative rotational movement between the steering device and the one or more part(s) of the vehicle that are arranged for ground contact is allowed; and
   a main valve unit having a first valve member mechanically connectable to the steering device and a second valve member mechanically connectable to the one or more part(s) of the vehicle that are arranged for ground contact, wherein the first valve member is configured to interact with the second valve member to adjust a flow passage area in response to the relative rotational movement between the steering device and the one or more part(s) of the vehicle that are arranged for ground contact in order to control the rotational movement of one or more of the steering device and the one or more part(s) of the vehicle that are arranged for ground contact about the steering axis relative to a chassis.

2. The device of claim 1 further comprising:
a first element connected to a steering device; and
a second element connected to the one or more part(s) of the vehicle that are arranged for ground contact, the second element being mechanically coupled to the first element to allow the limited relative rotational movement;
wherein the first valve member is mechanically connected to the first element and the second valve member is mechanically connected to the second element.

3. The device of claim 2, further comprising a damper unit enclosing a main damping chamber that is adapted to contain hydraulic fluid and that is partitioned into a first damping chamber and a second damping chamber in fluid communication with the main valve unit such that a flow of damping fluid between the first and second damping chambers is adjusted in response to the adjustment of the flow passage area.

4. The device of claim 3, wherein the damper unit further comprises a delimiting part dividing the main damping chamber into the first damping chamber and the second damping chamber.

5. The device of claim 4, wherein the damper unit is a linear damper unit and the delimiting part is a piston.

6. The device of claim 4, wherein the damper unit is a rotational damper unit and the delimiting part is a wing element.

7. The device of claim 3, wherein the damper unit is integrated with the main valve unit.

8. The device of claim 3, wherein the second element is elastically coupled to the first element.

9. The device of claim 8, further comprising an elastic coupling means configured to elastically couple the first element and the second element.

10. The device of claim 8, wherein the second element is coupled to the first element with one of a torsion bar configured to be releasably connectable to the first element and the second element, a silent block bush, and a bearing to allow a limited relative rotational movement between the first element and the second element about a center axis of one of the torsion bar, silent block bush, and bearing.

11. The device of claim 10, wherein the center axis is arranged at a distance from the steering axis.

12. The device of claim 11 further comprising at least two mechanical stops for limiting the relative rotational movement between the first element and the second element.

13. The device of claim 12, wherein the at least two mechanical stops comprise at least one element slideably arranged in an opening between two surfaces portions such that the element is movable between the surfaces portions such that relative movement between the steering device and the attaching part is limited to rotational movement.

14. The device of claim 13, wherein the first valve member is arranged to interact with the second valve member to adjust an additional flow passage area in response to the relative rotational movement between the steering device and the one or more part(s) of the vehicle that arranged for ground contact in order to control the rotational movement of the steering device and the one or more part(s) of the vehicle that arranged for ground contact about the steering axis relative to the chassis.

15. The device of claim 14, further comprising an additional main valve unit having a third valve member mechanically connectable to the steering device and a fourth valve member mechanically connectable to the one or more part(s) of the vehicle that arranged for ground contact, the third valve member being arranged to interact with the fourth valve member to adjust an additional flow passage area in response to the relative rotational movement between the steering device and the one or more part(s) of the vehicle that arranged for ground contact in order to control the rotational movement of the steering device and the one or more part(s) of the vehicle that arranged for ground contact about the steering axis relative to the chassis.

16. The device of claim 15, wherein the first damping chamber and the second damping chamber are in fluid communication with the main valve unit(s) such that a flow of damping fluid between the first and second damping chambers is adjusted in response to the adjustment of the additional flow passage area.

17. The device of claim 16, wherein the flow passage area is arranged to adjust a flow of hydraulic fluid between the first damping chamber and the second damping chamber in a first direction, and wherein the additional flow passage area is arranged to adjust a flow of hydraulic fluid between the first damping chamber and the second damping chamber in a second direction, the second direction being opposite to the first direction.

18. The device of claim 15, wherein the additional main valve unit comprises adjustment means for adjusting the interaction between the third valve member and the fourth valve member.

19. The device of claim 1, wherein the main valve unit comprises adjustment means for adjusting the interaction between the first valve member and the second valve member.

20. The device of claim 1, further comprising:
a first sensor device configured to be in operational communication with the steering device and the one or more part(s) of the vehicle that are arranged for ground contact, the first sensor device configured to monitor a rotational position of the steering device relative to the one or more part(s) of the vehicle that are arranged for ground contact.

21. The device of claim 20, wherein the first sensor device is selected from a group of sensors comprising: a potentiometer, a hall effect sensor, and an optical sensor.

22. The device of claim 20 further comprising:
a first element connected to a steering device; and
a second element connected to the one or more part(s) of the vehicle that are arranged for ground contact, the second element mechanically coupled to the first element to allow the limited relative rotational movement between the steering device and the one or more part(s) of the vehicle that arranged for ground contact;
wherein the first sensor device configured to be in operational communication with the first element and the second element, the first sensor device adapted to monitor a rotational position of the steering device relative to the one or more part(s) of the vehicle that are arranged for ground contact.

23. The device of claim 22, wherein the second element or the one or more part(s) of the vehicle that are arranged for ground contact is elastically coupled to the first element or the steering device.

24. The device of claim 23, wherein the second element is coupled to the first element with one of a torsion bar, a silent block bush, and a bearing.

25. The device of claim 24, wherein one or both of the electronically controlled valve unit and the damper unit is adjustable in response to at least one parameter selected from a group comprising vehicle speed, vehicle acceleration, vehicle braking, the rotational position of the steering device and the one or more part(s) of the vehicle that are arranged for ground contact, and rotational acceleration of one or both of the steering device and the one or more part(s) of the vehicle that are arranged for ground contact relative to each other or relative to the chassis.

26. The device of claim 22 further comprising a second sensor device configured to be in operational communication with the chassis and one of the first element and the second element, the second sensor device configured to monitor a rotational position of the steering device or the one or more part(s) of the vehicle that are arranged for ground contact relative to the chassis.

27. The device of claim 26, wherein the second sensor device is selected from a group of sensors comprising: a potentiometer, a hall effect sensor, and an optical sensor.

28. The device of claim 26, wherein the first sensor device is configured to monitor a rotational position of the steering device relative to the one or more part(s) of the vehicle that are arranged for ground contact throughout at least part of said limited relative rotational movement between the steering device and the one or more part(s) of the vehicle that arranged for ground contact.

29. The device of claim 26, wherein the first sensor device is configured to monitor a rotational position of the steering device relative to the one or more part(s) of the vehicle that are arranged for ground contact throughout the whole of the limited relative rotational movement between the steering device and the one or more part(s) of the vehicle that arranged for ground contact.

30. The device of claim 29 further comprising an electrically controlled valve unit coupled to the first and second sensor devices, wherein the electrically controlled valve unit is configured to adjust a flow passage area in response to a signal from the first and second sensor devices representing the rotational position of the steering device relative to the one or more part(s) of the vehicle that are arranged for ground contact.

31. The device of claim 30 further comprising a damper unit in fluid communication with the electrically controlled valve unit, wherein the damper unit is configured to control a rotational movement of the steering device or the one or more part(s) of the vehicle that are arranged for ground contact relative to the chassis with a damping force adjusted in response to the adjustment of the flow passage area.

32. The device of claim 29 further comprising an electrically controlled damper unit adapted to control a rotational movement relative to the chassis of the steering device or the one or more part(s) of the vehicle that are arranged for ground contact, wherein the electrically controlled damper unit is coupled to the first and second sensor devices and is configured to adjust a damping force in response to signals from the first and second sensor devices representing the rotational position of the steering device.

33. The device of claim 32, wherein the damper unit is configured to control a rotational movement in one rotational direction.

34. The device of claim 32, wherein the damper unit is configured to control a rotational movement in both rotational directions.

35. The device of claim 32, wherein the damper unit is a linear hydraulic damper or a rotational hydraulic damper.

36. The device of claim 32, wherein the damper unit is a magnetorheological damper or an electromechanical damper.

37. The device of claim 29 further comprising two electrically controlled valves coupled to the first and second sensor devices, wherein each of the two electrically controlled valves is configured to adjust a flow passage area in response to a signal from the first and second sensor devices representing the rotational position of the steering device.

38. The device of claim 37 further comprising a damper unit in fluid communication with the two electrically controlled valves, wherein the damper unit is adapted to control a rotational movement relative to the chassis of the steering device or the one or more part(s) of the vehicle that are arranged for ground contact with a first damping force in one direction and a second damping force in a second and opposite direction and the first and second damping forces are adjusted in response to the adjustment of the flow passage areas.

39. The device of claim 38, wherein the first sensor device comprises a first member mechanically coupled to the first element or the steering device and a second member mechanically coupled to the second element or the one or more part(s) of the vehicle that are arranged for ground contact, wherein the first valve member is configured to interact with the second valve member to provide a signal representing the relative rotational position of the steering device and the one or more part(s) of the vehicle that are arranged for ground contact.

40. The device of claim 38, wherein the second sensor device comprises a third member mechanically coupled with the first element or the steering device and a fourth member mechanically coupled with the second element or the one or more part(s) of the vehicle that are arranged for ground contact, wherein the third member is configured to interact with the fourth valve member in order to provide a signal representing the relative rotational position of the steering device and the one or more part(s) of the vehicle that are arranged for ground contact.

41. A device intended for a vehicle, comprising:
a steering device rotatable about a steering axis for adjusting a direction of one or more part(s) of the vehicle that are arranged for ground contact;
an attaching part that couples the steering device and the one or more part(s) of the vehicle that are arranged for ground contact such that a limited relative rotational movement between the steering device and the one or more part(s) of the vehicle that are arranged for ground contact is allowed; and
a main valve unit having a first valve member mechanically connectable to the steering device and a second valve member mechanically connectable to the one or more part(s) of the vehicle that are arranged for ground contact, wherein the first valve member is configured to interact with the second valve member to adjust a flow passage area in response to the relative rotational movement between the steering device and the one or more part(s) of the vehicle that are arranged for ground contact in order to control the rotational movement of one or more of the steering device and the one or more part(s) of the vehicle that are arranged for ground contact about the steering axis relative to a chassis.

* * * * *